G. P. FINNIGAN.
ELECTROPNEUMATIC CONTROL.
APPLICATION FILED AUG. 4, 1913. RENEWED MAR. 15, 1919.

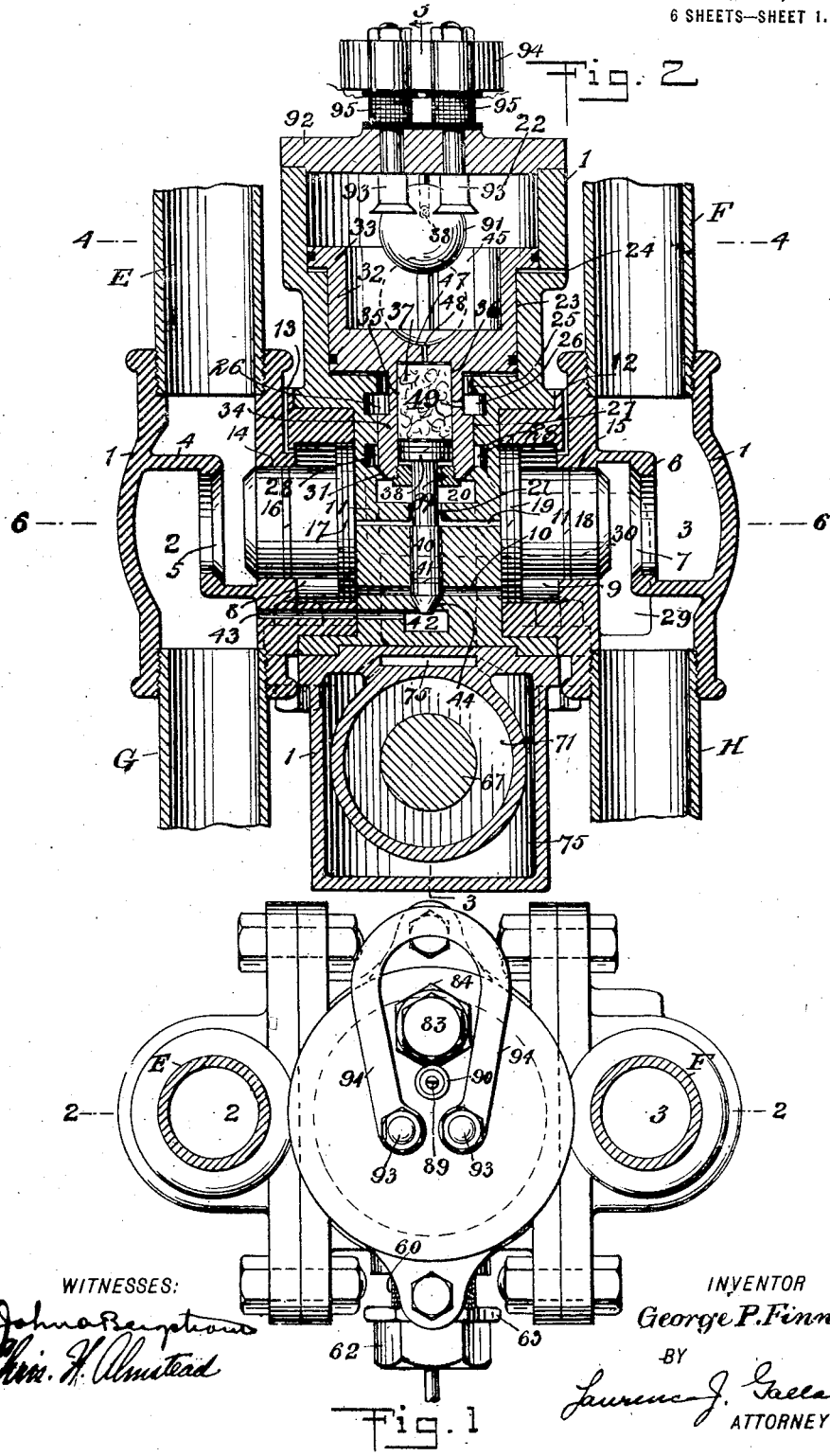

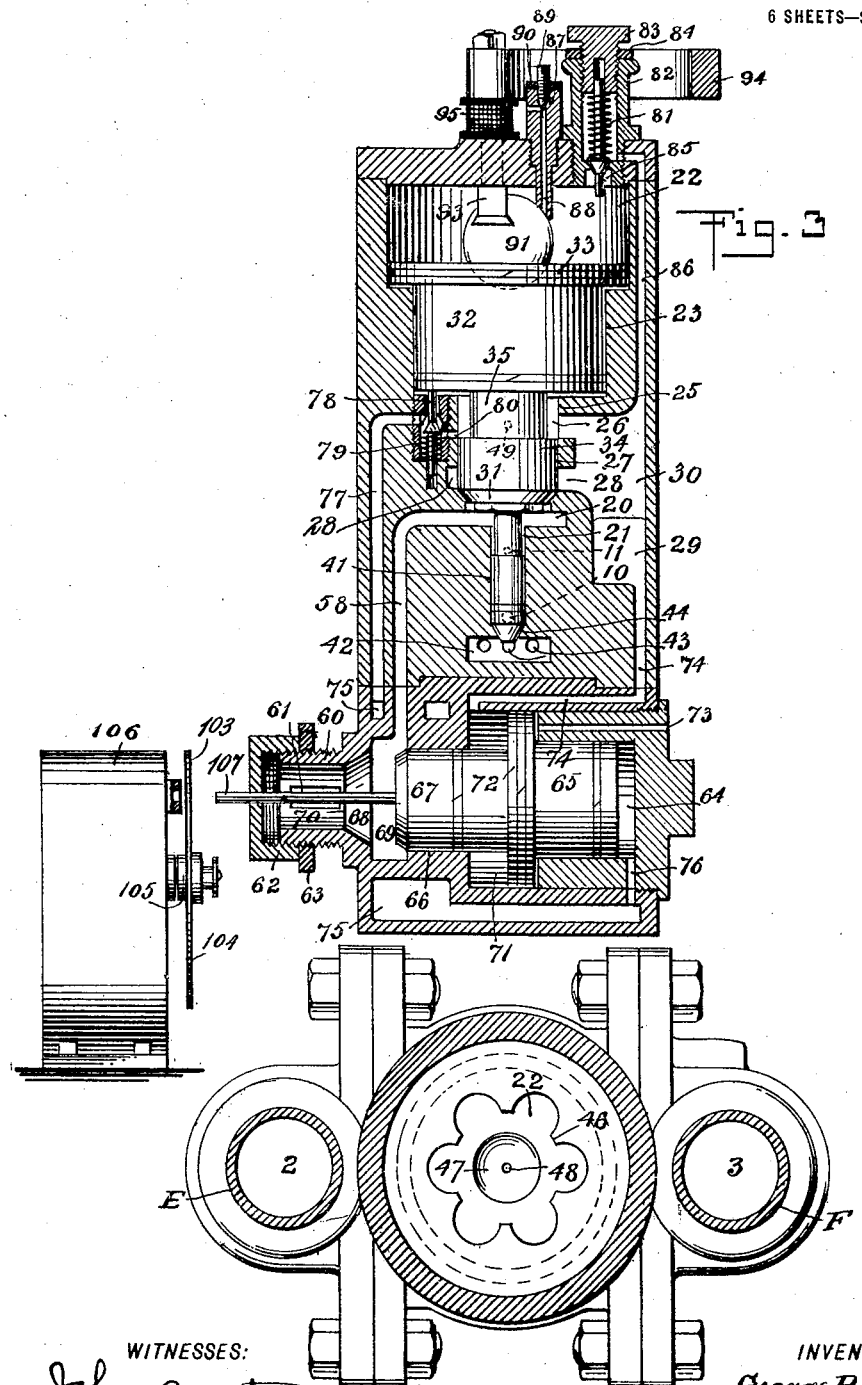

1,346,882. Patented July 20, 1920.
6 SHEETS—SHEET 3.

WITNESSES:
INVENTOR
George P. Finnigan
BY
ATTORNEY

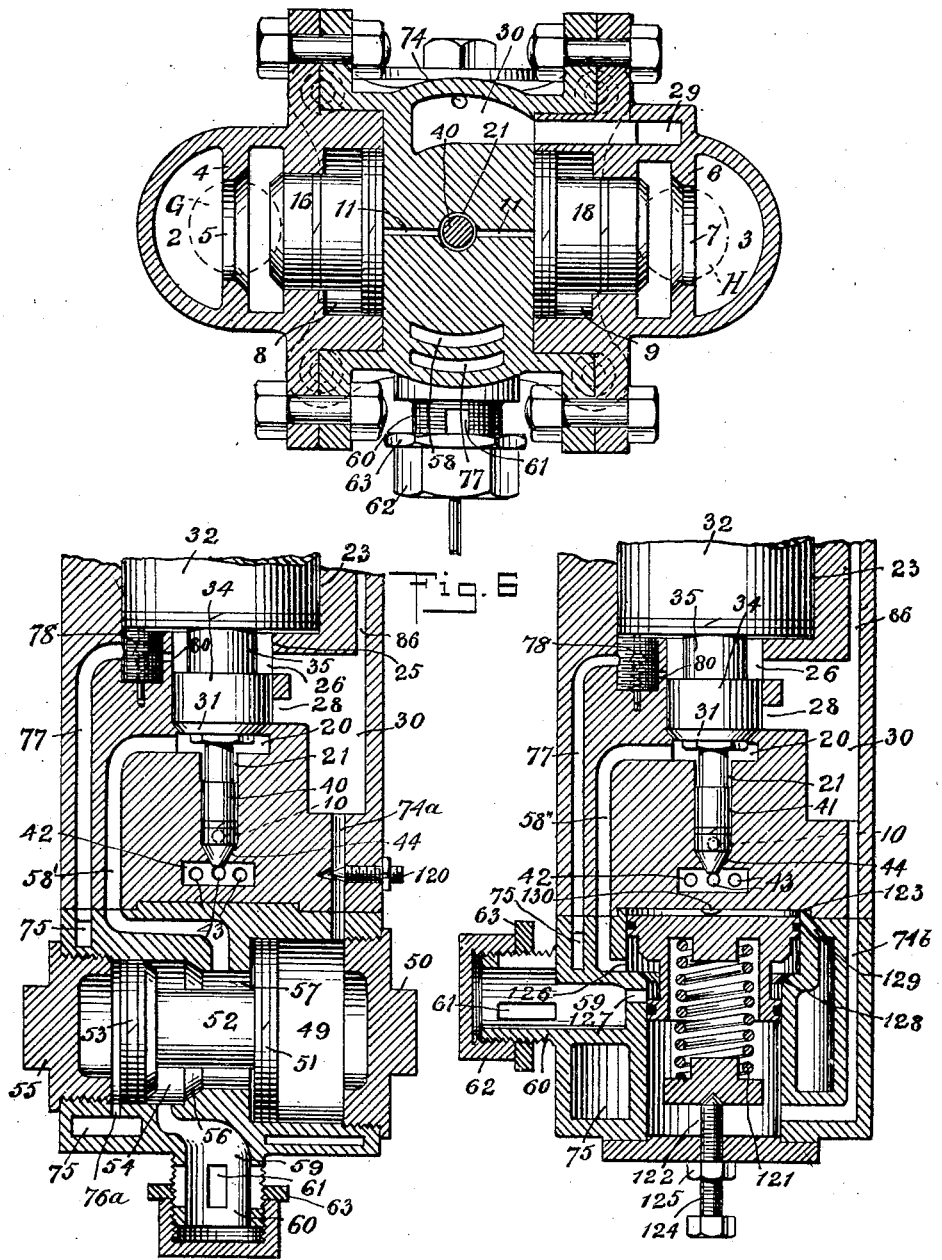

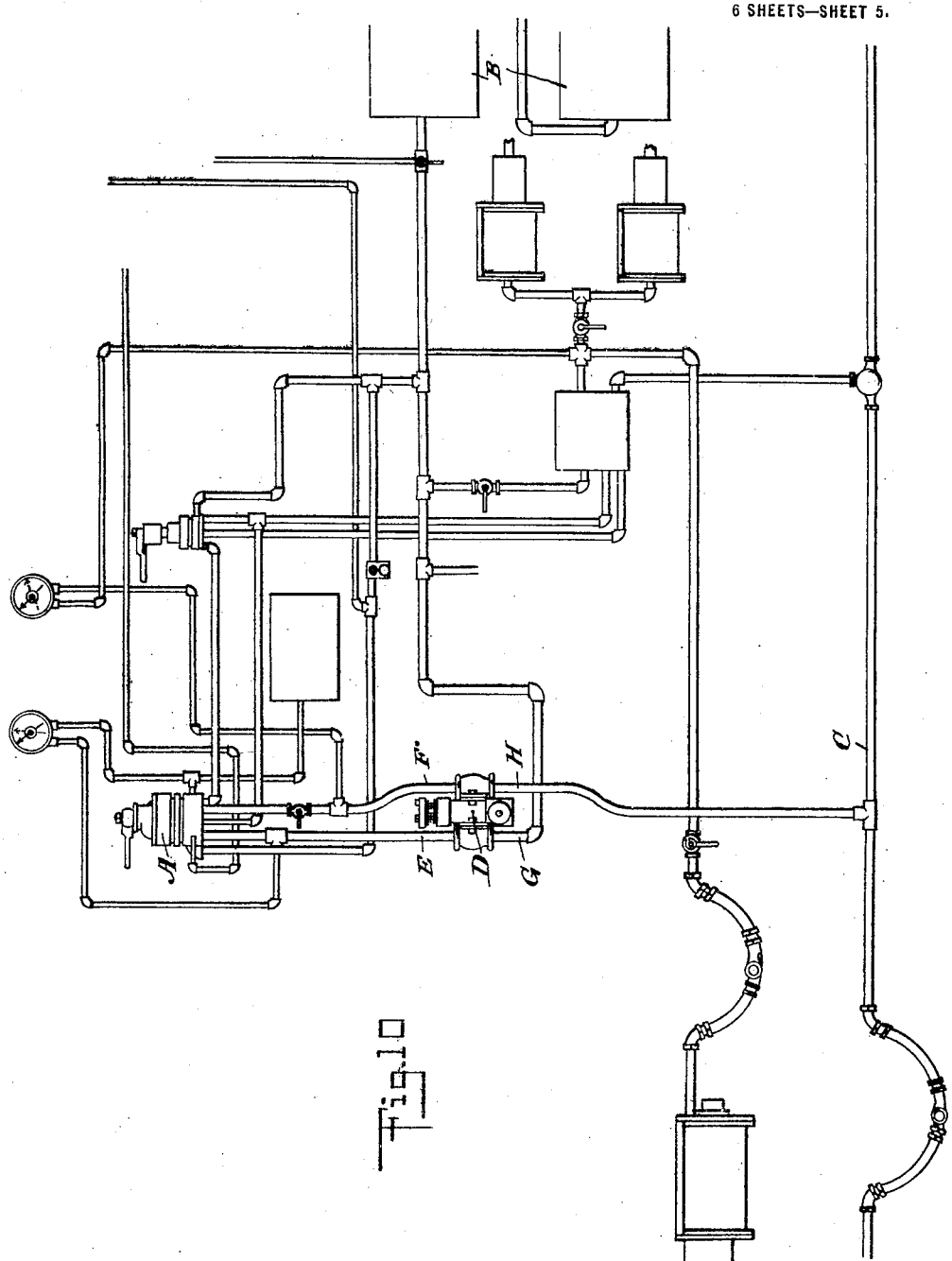

G. P. FINNIGAN.
ELECTROPNEUMATIC CONTROL.
APPLICATION FILED AUG. 4, 1913. RENEWED MAR. 15, 1919.
1,346,882.
Patented July 20, 1920.
6 SHEETS—SHEET 6.
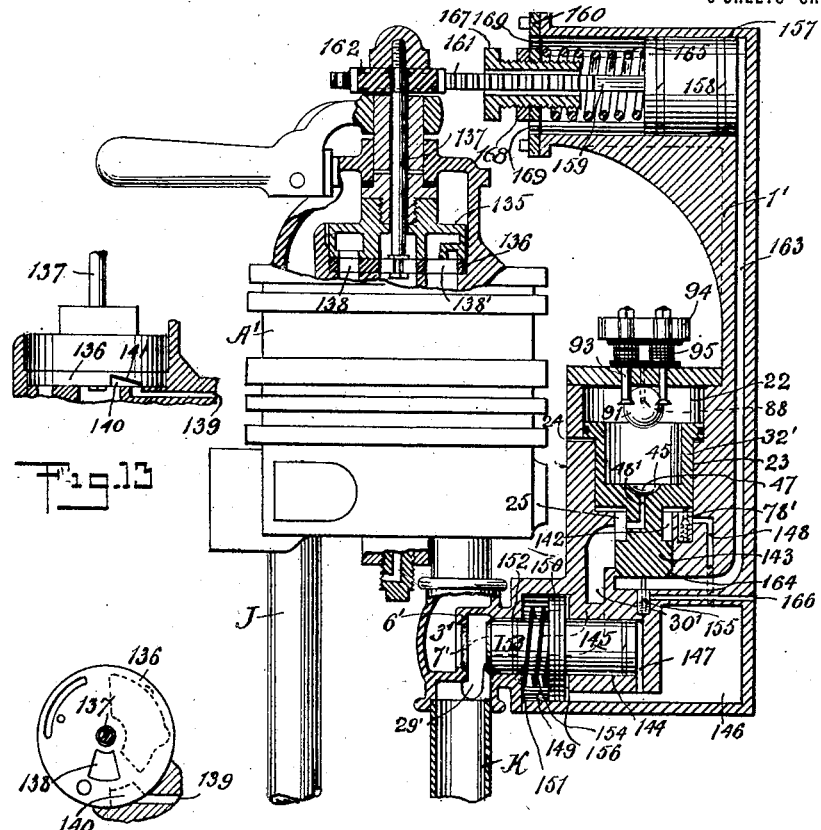
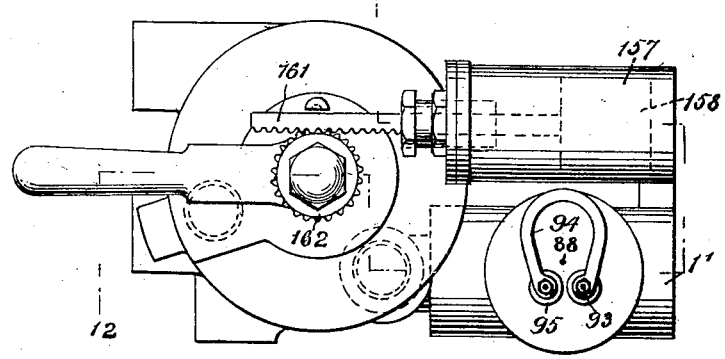
WITNESSES:
INVENTOR
George P. Finnigan
BY
Lawrence J. Gallagher
ATTORNEY

UNITED STATES PATENT OFFICE.

GEORGE P. FINNIGAN, OF RICHMOND, VIRGINIA.

ELECTROPNEUMATIC CONTROL.

1,346,882. Specification of Letters Patent. Patented July 20, 1920.

Application filed August 4, 1913. Serial No. 782,923. Renewed March 15, 1919. Serial No. 282,947.

*To all whom it may concern:*

Be it known that I, GEORGE P. FINNIGAN, a citizen of the United States, and a resident of Richmond, in the county of Henrico and State of Virginia, have made new and useful Improvements in Electropneumatic Control, of which the following is a full, clear, and exact description.

This invention relates generally to an electro-pneumatic train control and is more particularly directed to a mechanism, adapted to be set in operation by electro-magnetic means at a predetermined train speed or under certain existing conditions in the right of way of the train, for stopping the train or reducing the speed thereof.

The mechanism is adapted for use with an air brake system including an engineer's valve, the mechanism being operable independently of the valve; the mechanism controls the train speed, under certain conditions, by coöperation with the brake system; under certain conditions, as for instance, train speed, the mechanism brings about an application of the brakes by providing for reduction of train pipe pressure; the mechanism comprises parts for limiting the amount of reduction of such pressure; when the mechanism begins to operate the engineer's valve is rendered inoperative and means are provided, which are adjustable in nature, for maintaining the valve in such relation for a period of time; after the expiration of such period parts of the mechanism are in such position that the engineer's valve may be operated to increase train pipe pressure and thereby release the brakes; the said mechanism comprises a member of magnetic material normally occupying a certain position, a circuit being adapted for coöperatation with the said member and the means holding it in position whereby it may be brought to a second position with consequent operation of the mechanism; the said mechanism is automatic in that after bringing about the results set forth the parts thereof are returned to normal position and adapted for further operation.

Certain conditions, such as train speed or traffic conditions in the right of way or the condition of the right of way, determine the operation of the mechanism; once the mechanism begins to operate control of the brake system is taken from the engineer's valve and the brakes are applied at a given reduction for a given period of time; after such period of time the engineer's valve may be manipulated to release the brakes; the advantages following the use of a structure embodying such inventive idea are obvious and especially so when means are provided for insuring a record of each operation of the mechanism; if an engineer proceeds along the right of way with indications against such procedure or if he proceeds at a forbidden speed, or if, for any cause, he should be incompetent to check such procedure the mechanism will bring about control of the train speed, either reducing the speed or stopping the train; the release of the brakes is then brought about by manipulation of the engineer's valve which is returned to operative relation after an interval of time.

Many advantages following the use of a structure embodying the inventive idea disclosed will appear as the description of the construction and operation of different forms of such structure is set forth.

In the accompanying sheets of drawings, wherein like reference characters refer to similar parts in the several views—

Figure 1 is a top plan view, partly sectional, of the mechanism;

Fig. 2 is a vertical sectional view on the line 2—2 of Fig. 1;

Fig. 3 is a vertical sectional view on the line 3—3 of Fig. 2;

Fig. 4 is a horizontal sectional view on the line 4—4 of Fig. 2;

Fig. 5 is a view similar to Fig. 2 showing the relation of the parts during operation;

Fig. 6 is a horizontal sectional view on the line 6—6 of Fig. 2;

Fig. 7 is a sectional view similar to Fig. 3 showing a modified arrangement of some of the parts;

Fig. 10 shows the arrangement of parts of the brake system on the locomotive with the mechanism;

Fig. 11 is a top plan view of a modified construction providing for operation of parts of the engineer's valve;

Fig. 12 is a sectional view on the line 12—12 of Fig. 11;

Fig. 13 is a detail sectional view showing the disks of the said valve;

Fig. 14 is a plan view of the disk operated by the mechanism.

Figure 8:
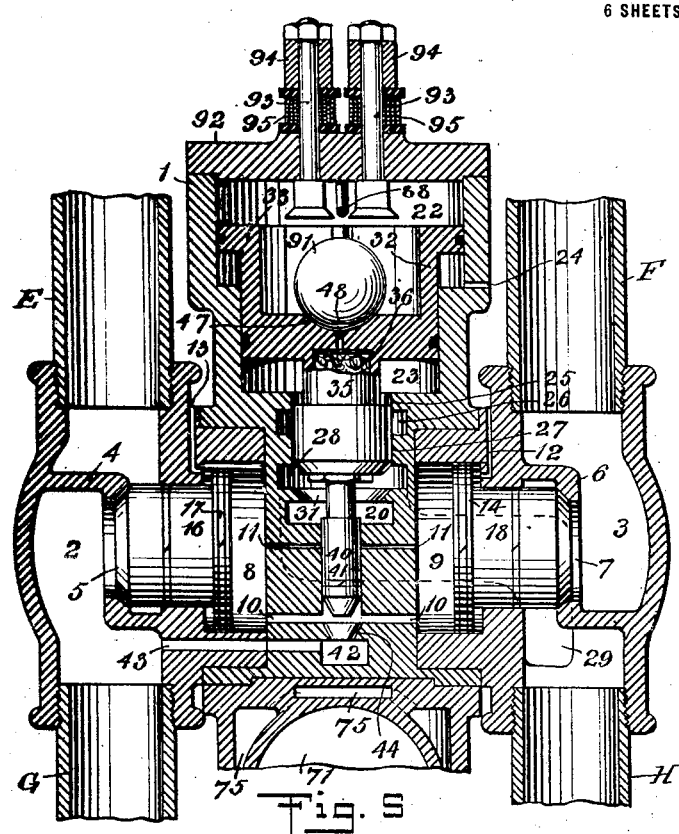
Fig. 8 is a similar view showing a further modification.

The relation between the control mechanism and the parts of the brake system is set forth in Fig. 10; the engineer's valve A, the main reservoir B, the train pipe C occupy the usual relation among themselves, the control mechanism, designated as a whole by D, being positioned between the engineer's valve and the main reservoir and between the said valve and the train pipe; connections E, F lead from the said mechanism to the engineer's valve and connections G, H lead from the said mechanism to the main reservoir and the train pipe respectively.

Referring particularly to Figs. 1 and 2 and the sectional views indicated on such figures, the body member 1 of the said mechanism is provided with passageways 2, 3, the connections E and G being in communication with the passageway 2 and the connections F, H being in communication with the passageway 3; under normal conditions the connections E and G communicate with each other and the connections F and H communicate with each other, that is, the engineer's valve is maintained in normal relation with the main reservoir B and the train pipe C and the brakes may be manipulated by the valve as usual. Within the passageway 2, and extending thereacross, is a partition 4 provided with a valve seat 5, a partition 6 provided with a valve seat 7 extending across the passageway 3; the body of the mechanism is provided with spaced chambers 8, 9 communicating with each other by means of the passageways 10, 11, the said chambers being in communication with the atmosphere through the passageways 12, 13; the chamber 8 communicates with the passageway 2 through an opening 14 and the chamber 9 communicates with the passageway 3 through an opening 15; within the chamber 8 is a valve 16 seated in the said opening 14, the inner end of the valve being flanged as at 17, the diameter of the flanged portion being substantially equal to the diameter of the said chamber; the outer end of this valve is adapted, under certain conditions, to engage the valve seat 5 in the partition 4 whereby communication between the connections E and G leading to the passageway 2 is closed; within the chamber 9 is a valve 18 seated in the opening 15, the inner end of the valve being flanged as at 19, the diameter of the flanged portion being substantially equal to the diameter of the said chamber 9; the outer end of this valve 18 is adapted, under certain conditions to engage the valve seat 7 in the partition 6 whereby communication between the connections F and H leading to the passageway 3 is closed; the closing of the said valves 16, 18 closes communication between the engineer's valve and the main reservoir and between the engineer's valve and the train pipe, whereby the engineer's valve is rendered inoperative and the application of the brakes depends on the mechanism.

Within the body of the mechanism is a chamber 20, communicating with the atmosphere under normal conditions, the said chamber also communicating with the beforesaid passageway 11 under such conditions through a passage 21; this passageway 11, which leads to the back of each of the valves 16, 18 is closed under certain conditions by means to be subsequently set forth; it may be noted here that the means which is employed to close the passage 21, and thereby cut off communication of the said passageway 11 with the atmosphere, also serves to place the before-mentioned passageway 10, also leading to the back of each valve 18, 16, in communication with main reservoir pressure. The pressures acting against the fronts of the valves 16, 18 maintains them in the position shown in Fig. 2 since only atmospheric pressure is acting on the backs of the said valves.

The top of the body member 1 is provided with a chamber 23 having a counterbored portion forming a chamber 22, an outlet 24 to the atmosphere being provided adjacent the top of the chamber 23; the bottom wall of this chamber is provided with an opening 25 beneath which is a chamber 26 of greater diameter than the said opening; beneath the opening 25 and chamber 26, and coaxial therewith is a second opening 27 which serves as a guiding means for a valve to be presently described; beneath this opening 27 is a chamber 28 which communicates with the aforesaid chamber 26, both of these chambers normally communicating with a pocket 29 through a passage 30; it is to be noted that the said pocket 29 is adjacent the before-mentioned horizontal valve 18 and communicates with the train pipe H whether the said horizontal valve is open or closed; the said chamber 28 is above the chamber 20 previously described, the chambers being normally out of communication but adapted to be placed in communication when the said valve, above mentioned, moves; the peripheral portion of the normally closed opening between the chambers 28 and 20 forms a valve seat 31; from the description given, and in connection with Fig. 2 particularly, it will appear that chambers 22, 23, 26, 28 and 20 are located one below the other, the openings 25, 27, valve seat 31 and opening 21 being between various of the chambers, the passageway 11 lying below them and being normally in communication with the chamber 20.

Within the chambers 22, 23 is a piston valve 32, the lower portion thereof being substantially equal in diameter to the diameter of the lower chamber 23, the top portion of the piston being flanged as at 33, the diameter of such portion being substantially equal to the diameter of the upper chamber 22; it is to be noted that the total area of the upper end portion of this piston is substantially greater than the total area of the lower end portion; when the piston is in normal position (Fig. 2) the outlet 24 to the atmosphere comes adjacent the under side of the flange 33; depending from this piston is an extension 34, the lower end of which is adapted, when the said piston is in normal position, to engage the beforesaid valve seat 31 whereby communication between chambers 28 and 20 is prevented; the beforementioned opening 27 between the chambers 28 and 26 receives this extension and holds it in position for movement; that portion of the extension adjacent the lower side of the piston 32 is of reduced diameter, as at 35, such reduced portion normally lying adjacent the opening 25 and chamber 26 whereby any pressure present in the said chamber is brought to bear on the lower end portion of the piston; in the extension 34 is a pocket 36 which contains a quantity of material 37 adapted to act as a strainer or filter; a port 49 is formed in the said extension thereby placing the pocket 36 therein normally in communication with the chamber 26; loosely mounted within the pocket 36 is a piston 38, held in position in any suitable manner as by means of a bushing 39, a rod 40 extending downwardly from the extension and exteriorly thereof; the upper portion of the rod is of reduced diameter and extends through the before-mentioned passage 21 (of greater diameter than the said reduced portion) when the rod is in normal position; the body member 1 is provided with an opening 41 communicating with the passageways 10, 11, the end portion of the rod 40 being contained within the opening, the side wall of which embraces it, the opening forming a guide for the rod in order to hold it in proper position; beneath the said opening 41 is a chamber 42 which communicates with the passageway 2 on the main reservoir side thereof through passages 43; the lower end portion of the opening 41 is formed into a valve seat 44 with which the lower end of the said rod 40 normally engages thereby closing communication between the chamber 42 and the passageways 10 which lead to the rear of the horizontal valves 16, 18; the piston 32 is provided with a recess 45, the side wall of which is shaped substantially as shown in Fig. 4, guides 46 being thereby provided; the bottom of the recess is provided with a pocket 47, a port 48 in the valve placing the chamber 22 adjacent the top of the piston, the recess and pocket in the piston in communication with the pocket 36 in the extension 34.

The said mechanism, adjacent the lower portion thereof, is provided with a chamber 64 in which a piston 65 is mounted; an opening 66 is provided in which a smaller piston 67 moves, the outer end thereof acting as a valve and adapted, under certain conditions to engage the valve seat 68, the chamber 69 being provided between the said seat and the said opening; the valve seat 68 forms the side wall of a port 70 which leads to the atmosphere, the port extending through a boss 60 on the exterior of the body of the mechanism, slits 61 being formed therein; adjustably mounted on the said boss is a cap 62 held in set position by means of a lock nut 63; the slits 61 may be closed more or less by manipulation of the said cap thereby providing for variation in the effective size of the said slits; between the chamber 64 and the opening 66 is a larger chamber 71 in which a piston 72, of substantially equal diameter, is carried, the said pistons 65, 67 and 72 being preferably formed in one piece; the chamber 71, to one side of the piston 72, communicates with the atmosphere through a port 73, the said chamber, on the opposite side of the said piston communicating with the before-mentioned pocket 29 through a passageway 74; the chamber 69 communicates with the chamber 20 through a passageway 58; the chamber 64 adjacent one side of the piston 65 communicates with a substantially annular chamber 75 through a port 76, the said annular chamber being in communication with a passageway 77 (to be subsequently mentioned).

Within the body member of the mechanism and adjacent the lower end portion of the piston 32 (Fig. 3), and engaged thereby when the piston is in normal position is a needle valve 78; this valve is preferably mounted in a body member 79 and comprises a spindle carrying the valve proper which, under certain conditions, is closed by a spring contained therein; the valve is normally open, the spindle thereof being of sufficient length to extend into the lower chamber 23 adjacent the top of the body member and be engaged by the piston 32 when this piston is in normal position; this valve is positioned between the passageway 77 and the chamber 26, a port 80 leading from the said chamber to the under side of the valve; the open position of this valve provides for communication between the said chamber and the said passageway, the closed position of the valve cutting off such communication.

Adjacent the top of the body member is a needle valve 81, which is normally closed by means of a spring, the valve and the spring being carried in a housing 82 which is on the exterior of the mechanism whereby the valve is accessible; the top of the housing is closed by a cap 83 maintained in adjusted position by means of a lock nut 84, the tension of the spring being adjustable through manipulation of the said cap; this valve normally closes a port 85 at the top of the chamber 22 and thereby prevents communication between the passageway 86 and the said chamber (under normal conditions), the passageway 86 communicating with the passage 30 having the pocket 29 leading therefrom and which extends to one side of the partition (Fig. 2) 6 in the passageway 3.

Adjacent the top of the mechanism and providing communication between the chamber 22 and the atmosphere is a valve 87, the passage 88 therein being controlled by the screw 89 held in adjusted position by means of a lock nut 90; this valve serves as a timing device whereby the passage of air from the said chamber, or the reduction of pressure therein, may require more or less time during operation of the mechanism; the passage 88 in this valve is normally closed by a ball 91 of magnetic material which is held in position and the movement of which is controlled by electro-magnetic means of substantially the following nature.

Figure 9:
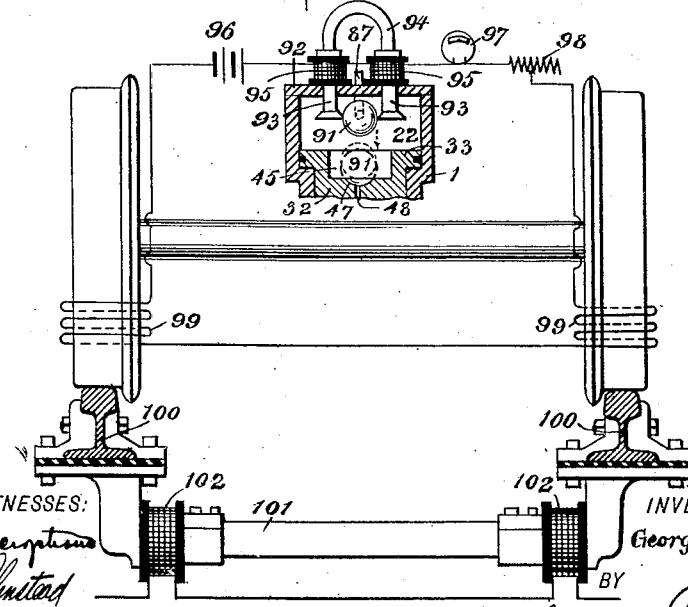
Fig. 9 is a diagrammatic view showing the means for bringing about operation of the mechanism.

Extending into the chamber 22 and preferably carried by the cover plate 92 are the pole pieces 93 of magnetic material, a permanent magnet 94 having the ends thereof secured to the said pole pieces; the effect of the permanent magnet is to make one of the pole pieces a north pole and the other pole piece a south pole; carried on the said pole pieces are windings 95 adapted to be excited by a source of energy; the circuit (to be presently described) comprising the said windings and source of energy provides a magnetic field in the said pole pieces, which field is independent of the field due to the permanent magnet 94; these windings are so arranged that the winding carried on the pole piece which is of north polarity due to the permanent magnet is a south pole and the pole piece which is of south polarity due to the permanent magnet is a north pole, that is the magnetic field due to the windings is opposed to the magnetic field of the magnet (permanent); the strength of field due to the said windings is of sufficient value to not only neutralize the field due to the permanent magnet but also to hold the ball 91 adjacent the said pole pieces and close the passage 88 in the said valve 87 when the mechanism is in normal condition. Referring particularly to Fig. 9 which is a diagrammatic representation of the circuit associated with the said windings, it will be noted that the said windings 95 form part of this circuit which includes a source of energy, as battery 96, an indicator 97, an adjustable resistance 98 and coils 99; this circuit is a closed one, current from the said source of energy passing therethrough; the rails of the right of way are designated 100 and a bar 101 of magnetic material (but which may in some instances be an unmagnetized bar) extends across the said rails, lying adjacent to each but insulated therefrom; windings 102 are carried on the bar, being in circuit with any suitable source of energy or adapted to be placed in circuit with such source under certain conditions; the before-mentioned coils 99 are adjacent the wheels of the vehicle and extend around the said wheels, the flux controlled by the track coils 102, under certain conditions, passing through the rails 100 the wheels resting thereon and the axle connecting these wheels, such flux coöperating with the coils 99 and inducing a current in the circuit which includes the windings 95 on the pole pieces 93 whereby the mechanism previously described is operated whereupon the ball 91 is dropped from the said pole pieces; the combination of the track structure with the coils on the vehicle and the electro-magnetic device controlled thereby forms the subject-matter of co-pending applications Serial Numbers 444,570 and 574,426 and 653,821, filed July 21, 1908, July 26, 1910, and Oct. 10, 1911, respectively.

Before proceeding to a description of the operation of the mechanism in controlling the brakes the relation of the various elements making up the mechanism together with the conditions of pressure therein will be set forth; the mechanism is positioned as shown in Fig. 10 and the parts of the mechanism are in normal position, as is shown in Figs. 1, 2, 3, 6 and 9; main reservoir pressure is present in the connection G, the passageway 2 and connection E, passing on to the engineer's valve A, such pressure acting against the outer end of the piston valve 16 and maintaining it in the position shown in these figures, the rear of the chamber which contains this valve communicating with the atmosphere through passageway 11, chamber 20, passageway 58, chamber 69 and slits 61 in the boss 60; the atmosphere also communicates with the chamber 8 containing this valve and at the front end of this chamber through the passageway 13; main reservoir pressure is also present in the passageways 43 and the chamber 42 and is acting against the lower end of the rod 40 which is engaged with the valve seat 44; the train pipe pressure is present in the connection F leading from the engineer's valve, the passageway 3 and the connection H leading to the train pipe; this pressure acts against the outer end of the piston valve 18 and maintains it in the position shown in these figures; one end of the chamber 9 which contains this valve communicates with the atmosphere through a passageway 11, chamber 20, passageway 58, chamber 69 and slits 61 in the boss 60; the atmosphere also communicates with the chamber 9 containing this valve and at the front end of the chamber through the passageway 12; train pipe pressure is also present in the pocket 29, passageway 30 and chambers 26 and 28; from the chamber 26 this pressure passes through the port 49 into the pocket 36 in the extension 35, through the strainer material 37 therein, through the port 48 into the recess 45 and the chamber 22 adjacent the top of the mechanism; the ball 91 being in position to close the opening 88 in the valve 87 this chamber is out of communication with the atmosphere; pressure from the chamber 26 is also brought to bear against the lower end of the piston 32, the area of the said lower end (as already mentioned) being less than the area of the upper end of this piston; the piston 32 occupying the lower chamber 23 the passageway 24 which communicates with the atmosphere terminates adjacent the piston; the pressure present in the pocket 36 in the extension 35 acts against the piston 38 located in the pocket and maintains the lower end of the rod 40 in engagement with the valve seat 44; the train pipe pressure from the said pocket 29 communicates with one side of the piston 72 in the chamber 71 through the passageway 74, the piston 65 (which is secured to the piston 72) in the chamber 64 having such pressure bearing thereagainst because of the port 76 communicating with the annular chamber 75 which in turn communicates with the passageway 77; such pressure is brought in to this passageway 77 from the pocket 26 and through the port 80, the valve 78 being open because of the engagement of the piston 32 with the stem of the said valve; while train pipe pressure is present against one side of the said piston 72 only atmospheric pressure acts against the other side and through the passageway 73; finally, the needle valve 81 (adjacent the top of the mechanism) has train pipe pressure acting on opposite sides thereof; the lower side of this valve communicates with the chamber 22 and the upper side thereof with the passageway 86 which communicates with the said passageway 30 and pocket 29; such is the normal relation of the parts of the mechanism; application of the brakes by means of the engineer's valve is permitted as usual, no change occurring in the relation of the parts of the said mechanism through such application.

Suppose now that the speed of the train or track conditions in the right of way is such that an E. M. F. is induced in the circuit containing the windings 95 (Fig. 9) by reason of the coils 99 cutting the flux set up by the windings 102 on the track bar 101, the said induced E. M. F. being superposed on the E. M. F. of the said circuit; the net result of such superposition, at certain intervals, is zero E. M. F. in the said circuit with resultant zero field of the windings 95; since the field of the windings 95 is opposed to the field due to the permanent magnet (the field of the windings being sufficient to hold the ball 91 in place) the direction of the flux through the said ball in normal position is in one direction; when the field of the said windings becomes weakened (because of the superposition of E. M. F.'s), the direction of the flux due to the permanent magnet being opposite to that due to the windings, a "kick" results which displaces the ball 91 from the said pole pieces and uncovers the passage 88 in the valve 87; the relation of the permanent magnetic field with the electro-magnetic field insures the dropping of the ball under the conditions mentioned, "freezing" of the ball to the pole pieces, because of the residual magnetism in the ball, being prevented; the dropping of the ball 91 places the chamber 22 in communication with the atmosphere, the ball becoming seated in the pocket 47 in the piston 32 thereby closing the port 48 in the piston; the pressure in the said chamber 22 now begins to reduce, the piston 32 moving upwardly, the passage 24 placing the portion of the chamber beneath the larger upper end of the piston in communication with the atmosphere, rarefaction being thereby prevented; the time during which the total upward travel of the piston will occur is determined by adjustment of the screw 89, such time being substantially predetermined; the pressure causing the upward travel of the piston is train pipe pressure acting on the bottom of the said piston from the chamber 26 through the opening 25; as the said piston moves upwardly the rod 40 moves with it, the lower end thereof coming away from the valve seat 44 and placing the chamber 42, which is under the main reservoir pressure, in communication with the passageways 10 leading to the valves 16, 18; as the rod 40 moves to open the said communication it also comes into position to close the opening 21 between the chamber 20 (which communicates with the atmosphere) and the passageways 11 leading to the backs of the said valves 16, 18; the result of such operation is to cause outward movement of the valves 16, 18 adjacent the valve seats 5, 7 in the partitions 4, 6 whereby communication between the connections G and E (from the main reservoir and to the engineer's valve) is closed and communication between the connections F and H (from the engineer's valve and to the train pipe) is also closed, the engineer's valve being thereby cut off (for the time being) from the brake system; as the piston 32 begins to move upwardly the valve 78 closes, since the piston moves out of engagement with the valve spindle, air at train pipe pressure being thereby trapped in the passageway 77, chamber 75, port 76 and chamber 64 in the rear of the piston 65; this movement of the piston 32 has placed the pocket 29 (which communicates with the train pipe), passageway 30, chamber 28, chamber 20 and passageway 58 communicating therewith in communication with the atmosphere through the chamber 69 and the slits 61 in the boss 60 which communicate with the said chamber through the opening 70; the result of this is that the pressure in the train pipe is reduced, or the pipe is bled, with consequent application of the brakes; the rate at which pressure is reduced in the said pipe is varied by means of the cap 62 which is carried on the boss 60 and may occupy different positions in order to close the slits 61 varying amounts; since the pressure at the rear of the piston 65 is that of the train pipe before the said pipe began to bleed and since the pressure in front of the piston 67 is that of the atmosphere and since the interior of the chamber 71 in front of the piston 72 is the reduced train pipe pressure (after the train pipe has begun to bleed) it is clear that the pressure back of the piston 65 will force the pistons 65, 72 and 67 to the left (Fig. 3), the outer end of the piston 67 approaching the valve seat 68; this member made up of the pistons 65, 72 and 67 is adapted to coöperate with other elements in affording a means for recording times at which the train control mechanism has operated; referring particularly to Fig. 3 it will be noted that a record sheet 103 carried on a member 104 secured to a rotatable shaft 105 is adapted to be actuated by clock-work or other suitable motor in the casing 106; secured to the end of the piston 67 and extending through a suitable opening in the cap 62 on the boss 60 is a rod or stylus 107 adapted to engage the record sheet 103 and leave an impression thereon every time the said piston 67 moves to the left (Fig. 3) in the operation of the mechanism; of course such recording means is not essential to the mechanism, but is of value in affording means for keeping a record of the operation of such mechanism; it is clear that after the opening 70 is closed by movement of the said pistons further reduction of train pipe pressure is prevented; the said pistons and openings constitute means for limiting the amount of reduction of such pressure; the piston 32 continues moving upwardly, due to the reduced train pipe pressure acting against the lower end of the said piston and against the lower end of the extension 34 after the said extension has passed into the opening 25 and partially closed it; the diameter of the said opening 25 is such that the said extension loosely passes therethrough, pressure passing upwardly against the lower portion of the piston 32 through the space between the side wall of the said opening and the side of the extension; such relation of these parts prevents too rapid upward movement of the piston; when the piston 32 reaches the upper end of travel the ball 91 comes adjacent the pole pieces 93 in position to close the passageway 88 in the valve 87, the magnetic field holding the ball in such position; the upper end of the said piston then engages the lower end of the spindle of the valve 81 moving it upwardly and opening the said valve, the chamber 22 now being in communication with the train pipe pressure through the passageway 86; the area of the upper portion of the piston being greater than the area of the lower portion the said piston begins to travel downwardly or to reseat itself due to the difference between the total pressures acting on the piston; the period of time in which the piston 32 moves to such uppermost position is determined by the valve or timing device 87 which (as before described) is adjustable in order to vary the area of the passageway therein; the brakes will remain set at a certain pressure until the piston 32 returns to normal position, the valves 16, 18 and 67 being closed.

Since, as already set forth, the area of the top portion of the piston 32 is greater than the area of the lower portion train pipe pressure acting on top of the piston after the valve 82 has been opened (as already described) will cause the piston to move downwardly leaving the ball 91 held in normal position against the pole pieces and the said passageway 88 in the valve 87; after the necessary downward travel the rod 40 at the lower end of the piston will come adjacent the valve seat 44 thereby closing the chambers 8 and 9 to main reservoir pressure through the chamber 42 and placing the said chambers 8 and 9 in communication with the atmosphere through the passageways 11 and chamber 20, the piston valves 16 and 18 then being returned to normal position (Fig. 2) under the pressure of the main reservoir and of the train pipe respectively; after the said piston valves 16, 18 have returned to normal position the pressure in the train pipe may be brought back to normal by manipulation of the engineer's valve, with consequent release of the brakes; the downward travel of the piston valve 32 brings it into engagement with the needle valve 78, which is opened, the train pipe pressure being then placed in communication with the chamber 64 through port 76, chamber 75 and the passageway 77; train pipe pressure however also communicates with the chamber 71 and, the area of the piston 72 being greater than the area of the piston 65, such pressure will force the said pistons, and also the piston 67 to the right (Fig. 3) the air back of the piston 72 escaping to the atmosphere through the outlet 73; the various elements of the mechanism are now in normal position ready for operation at the next dropping of the ball 91, which is controlled by the speed of the train or conditions on the right of way; it will now be clear from the description given that the term "control" is not limited to stopping the train nor to mere application of the brakes; the term is employed to designate control of the speed from a mere reduction thereof to actual stopping, such conditions being determined by manipulation of the adjustable cap controlling the outlet area of the opening 68; it is also clear from the description given that the brakes will be maintained in applied position as long as the valves 16, 18 (which render the engineer's valve inoperative) are closed; before reservoir pressure can be availed of to open these valves the piston 32 and the rod 40 must have returned to normal position, and the brakes can be released then only by manipulation of the engineer's valve.

The mechanism described acts independently of the engineer's valve in applying the brakes and this valve may be operated independently of the said mechanism in manipulating the brake system; the circuit which controls the electromagnetic means (ball 91 and means for maintaining the magnetic field) may be designed to bring about operation of the said mechanism under certain predetermined conditions such as speed or condition of traffic or condition of the right of way, such circuit being more fully set forth in the co-pending applications referred to.

Referring now to Fig. 7 a modified form of valve is illustrated, such valve being also adapted to control the reduction of train pipe pressure in the operation of the mechanism; adjacent the lower end of the body member 1 is a chamber 49, one end of which is normally closed by a removable plug 50, the chamber containing a piston 51 having a stem 52 extending therefrom, a smaller piston 53 being carried at the end of the stem and adapted to act as a valve; opposite the chamber 49 is another chamber 54 of lesser diameter, one end of which is normally closed by a plug 55, and which contains the said smaller piston 53, the inner end portion of this chamber being formed into a valve seat 56 adapted to be engaged by the said smaller piston when in closed position; the said stem 52 extending between these pistons passes through a passageway 57 of greater diameter which communicates with the previously mentioned chamber 20 through a passageway 58', these passageways and the said chamber (as previously mentioned) communicating with the atmosphere through an opening 59; this opening extends through the boss 60, previously described, the boss being provided with the slits 61, the adjustable cap 62 and the lock nut 63; extending between the passageway 30 and the chamber 49 is a passageway 74ª having a valve 120 therein, the area of the said passageway being thereby adjustable and preventing a too sudden reduction of pressure in the chamber 49 when train pipe pressure in the chamber 30 is reduced; the chamber 75 in this instance communicates with the chamber 54 through a port 76ª, the passageway 77 which conveys train pipe pressure to the said chamber having the valve 78 therein as previously set forth. The operation of this structure is not essentially different from what has already been set forth; the upward movement of the piston valve 32 places the train pipe, through the chambers 30 and 20, in communication with the atmosphere through the opening 59 in the boss 60; movement of the said piston valve permits the valve 78, which controls the application of pressure to the chamber 75, to close whereby original train pipe pressure is trapped in the chamber 75; due to the movement of the said piston valve and the consequent reduction of pressure in the passageway 30 the pressure in the chamber 49 reduces slowly and the pistons 51 and 53 move to the right (Fig. 7); after a determined interval of time the piston 53 engages the valve seat 56 and communication between the train pipe and the atmosphere is prevented, further reduction of train pipe pressure being prevented, the amount of such reduction depending on the time during which the said opening 59 is uncovered, which time is controlled by the area of the open portions of the slits 61 in the boss 60; after the piston valve 32 has returned to normal position and the pressure in the train pipe and passageway 30 has been raised (by manipulation of the engineer's valve) the pistons 51 and 53 will be returned to normal position (moving to the left of Fig. 7) because of the pressure acting against the piston 51 of larger diameter than the piston 53; the chamber 20 has been removed from communication with the passageway 30 and the passageway 58' is open to the atmosphere since the piston 53 has moved away from the valve seat 56.

In Fig. 8 a further modification of valve serving the same purpose as the valves described in connection with Figs. 3 and 7 is illustrated; in this instance a spring 121 is used to maintain the valve in normal position with the opening 59 in communication with the atmosphere; the lower portion of the body member 1 is provided with a chamber 122 containing the piston valve 123, the valve being maintained in the position shown by means of the said spring which is contained in this chamber; one end of the spring bears against the valve and the other end bears against an adjustable screw 124 carried by the bottom wall of the chamber; the pressure which the spring exerts against the valve is varied by manipulation of the screw; a lock nut 125 preventing movement of the screw after adjustment thereof; the passageway 58″ leading from the chamber 20 communicates with the chamber 122 through a port 126, the chamber 122 communicating with the opening 59 through a port 127, a valve seat 128 between these ports being adapted for engagement by the said piston valve 123 whereby communication between the ports is closed during operation of the mechanism; the chamber 75 communicates normally with a train pipe pressure through the passageway 77 and valve 78, operation of the piston valve 32 permitting the valve 78 to close and thereby trap such pressure in the chamber 75 after the said piston valve 32 begins to move; this train pipe pressure acts against the upper end of the piston valve 123 through a port 129, a stop 130 being employed to determine the upper position of the said piston valve; after the piston valve 32 has begun to move the valve 78 is closed and the valve 123 will begin to move downwardly against the pressure of the spring 121 under the influence of original train pipe pressure in the chamber 75; in normal position of the mechanism this valve is held in the position shown by reason of the train pipe pressure from the passageway 74$^b$ acting against the bottom thereof, such pressure being added to the spring pressure; movement of the piston 32 has, however, reduced the train pipe pressure in the passageway 74$^b$, the consequence being that the force tending to move the valve downwardly is greater than the combined pressures of the spring 121 and the reduced train pipe pressure; the time in which the valve 123 will engage the valve seat 128, and thereby close communication between the passageway 58″ and the atmosphere, through the opening 59, with consequent prevention of further reduction in train pipe pressure, is determined as before, by adjustment of the cap 62 on the boss 60 which is provided with the slits 61; after the piston valve 32 has returned to normal position the chamber 75 is placed in communication with train pipe pressure (reduced) through opening of the valve 78 by the said piston; the pressures adjacent opposite sides of the valve 123 are equalized and the spring 121 will return the valve 123 to normal position as shown in Fig. 8, the brakes being then adapted to be released.

A structure embodying the inventive idea set forth is adapted for use as a means of operating the engineer's valve in order to bring about control of the brakes; such structure permits the valve to be used independently thereof in the usual application of the brakes; referring particularly to Figs. 11 to 14 inclusive the engineer's valve is designated A′ and the connection therefrom to the main reservoir as J, the connection to the train pipe being designated K; the engineer's valve is modified to the extent that beneath the disk 135 of the valve a second disk 136 is positioned, such second disk being attached to a spindle 137 concentrically arranged with the spindle attached to the handle of the said valve; this second disk is adapted to be turned by the said spindle 137 through means to be presently described; the second disk is provided with openings 138, 138′ registering with the usual openings in the usual valve disk whereby manipulation of the brakes by means of the handle in controlling the valve is permitted; the casing of the valve is provided with a port 139 communicating with the atmosphere and the disk 136 is provided on the under side (which is adjacent the train pipe connection K) with a pocket 140 adapted to be brought into communication with the said port whereby the train pipe pressure may be reduced; in order to provide for different degrees of reduction the bottom wall of the said pocket 140 is inclined or wedge-shaped as at 141, it being apparent that the rate at which air will flow from the said train pipe connection will depend on the relative positions of the said port and pocket; the structure embodying the inventive idea disclosed is substantially as follows: A body member 1′ is provided with the chambers 22, 23 in which is a piston valve 32′, the said chambers being similar to those previously described and the valve adapted to perform the same functions as the piston valve 32 already described; the passageway 88 between the chamber 22 and the atmosphere, and the electro-magnetic means for causing opening of the said passageway and which includes the member 91, the pole pieces 93, the permanent magnet 94, the windings 95 and the circuit associated therewith, are retained and are adapted to operate in substantially the manner described and to the same end; beneath the chamber 23 is a chamber 142 in which the extension 143 carried by the lower portion of the piston valve 32′ is positioned; the top portion of the piston 32′ is provided with the recess 45 having the pocket 47 in the bottom wall thereof, the port 48′ extending through the said bottom wall normally placing the chamber 22 in communication with the chamber 142; the port 24 which communicates with the atmosphere and prevents rarefaction within the chamber 22 when the said piston valve moves is also retained; in the connection K between the engineer's valve and the train pipe is a partition 6′ having an opening 7' therein, the normal relation of the parts permitting free communication of the engineer's valve with the said train pipe through the passageway 3'; beneath the said partition 6' and also communicating with the train pipe is a pocket 29' leading to a passageway 30' which communicates with the said chamber 142 whereby train pipe pressure is normally brought to bear against the lower portion of the piston valve 32' and also adjacent the upper portion thereof by reason of the port 48'; within the chamber 144 is a piston valve 145, the back of the said piston having train pipe pressure applied thereto by reason of the port 147 extending through the side wall of the said chamber and communicating with a second chamber 146 which in turn communicates with the first-mentioned chamber 142 through a passageway 148 having a valve 78' therein, such valve being normally maintained open by reason of the engagement of the piston 32' with the spindle of the said valve (similar to what has already been described); adjacent the chamber 144 and of larger diameter is a chamber 149 containing a piston 150, this chamber communicating with the atmosphere through a port 151; this chamber 149 is adjacent the passageway 3' in the train pipe connection, a piston 153 being contained in an opening 152 between the chamber and passageway, such opening forming a guide for the said piston during movement thereof; the outer end of the piston 153 is adapted, under certain conditions to engage the side wall of the opening 7' in the partition 6' whereby communication between the usual parts of the engineer's valve and the train pipe is cut off and the usual parts of the said valve thereby rendered inoperative in manipulation of the brakes; a spring 154 in the chamber 149 bears against the piston 150 and serves to maintain it in the position shown in Fig. 12; the before-mentioned chamber 146 which communicates with the chamber 144 through the port 147 also communicates with the piston 150 (adjacent the side opposite to the said spring 154) through a port 156; adjacent the top of the body member 1' is a cylinder 157 containing a piston 158, a rod 159 extending therefrom and through the cylinder head 160; the outer portion of this rod is provided with teeth forming a rack which engages a pinion 162 fixed to the upper end of the spindle 137 to which is secured the said second disk 136; extending from the cylinder 157 and communicating with the end of the piston therein is a passageway 163; the lower end of this passageway terminates in an opening 164, the side wall of which is formed as a valve seat which is normally engaged by the lower end of the extension 143 carried by the lower portion of the piston 32'; below the extension 143 projecting from the piston 32' and normally maintained in open position by engagement with the said extension is a valve 155; this valve provides communication between the passageway 163 leading to the back of the piston 158 and the atmosphere, through a port 166, whereby only atmospheric pressure acts against the back of the said piston; the valve closes when the piston 32' moves upwardly; within the cylinder 157 and extending between the head 160 and the end of the piston 158 is a spring 165 which maintains the piston normally in the position shown in Fig. 12; the cylinder head is provided with openings 169. The relation of the different parts shown in Fig. 12 in normal position with the pressures acting is as follows: The spring 165 maintains the piston 158 in the cylinder 157 in the position shown, the pocket 140 in the disk 136 being out of communication with the port 139; the member of magnetic material 91 is in position to close the passageway 88 between the atmosphere and the chamber 22 and the piston 32' is held in the position shown by reason of the train pipe pressure acting on the top and bottom portions thereof; with the piston in such position there is no communication of train pipe pressure with the passageway 163 and consequently only atmospheric pressure acting on the piston 158; train pipe pressure is acting on the end of the piston 153 adjacent the train pipe connection K and such pressure passes through the pocket 29', passageway 30' and chamber 142; the piston 32' has such pressure acting on the top and bottom portions thereof, the top of the piston being of greater area than the bottom; from the passageway 30' such pressure is communicated to the chamber 146 and that part of the chamber 149 adjacent the back of the piston 150 and that part of the chamber 144 adjacent the back of the piston 145 through the passageway 148; these pistons 145, 150 and 153, which form one piece, are held in the position shown by the spring 154. The operation of the mechanism is as follows: When the member 91 is moved away from the passageway 88 and becomes seated in the pocket 47 in the piston 32' there is a reduction of pressure adjacent the top of the said piston with consequent upward movement thereof; such movement brings the lower end of the extension 143 away from the opening 164 and traps air at train pipe pressure in the chamber 146 and the portions of the chambers 144 and 149 adjacent the pistons 145 and 150 because of the ports 147 and 156, the valve 78' in the passageway 148 closing; the valve 166 also closes and train pipe pressure is brought to bear against the end of the piston 158 in the cylinder 157 because the passageway 163 is then in communication with the passageway 30'; the piston 158 is then moved to the left (Fig. 12) with consequent turning of the second disk 136 whereby the pocket 140 in the said disk communicates with the port 139 to the atmosphere, train pipe pressure being then reduced; the pistons 145, 150 and 153 are then moved to the left (Fig. 12), the piston 153 closing the opening 7' in the partition 6' with consequent inoperativeness of the usual parts of the engineer's valve, such movement being against the pressure of the spring 154 in the chamber 149 and being due to the difference between original and reduced train pipe pressures; the usual parts of the engineer's valve cannot be availed of to bring about increase in train pipe pressure, and thereby release the brakes, until the valve 153 returns to the position shown in Fig. 12; as the piston 32' moves upwardly it brings the member of magnetic material 91 adjacent the pole pieces 93, the magnetic field adjacent the said pole pieces holding the member in such position and closing the passageway 88 communicating with the atmosphere; train pipe pressure now passes through the port 48' in the piston 32' and such pressure acting on the top portion of this piston brings about a return movement thereof to normal position (because of the greater area of the said top portion); as the piston 32' comes back to normal position the extension 143 engages the valve 155 and opens it, the passageway 163 being thereby placed in communication with the atmosphere through the port 166, the consequent reduction of pressure in the cylinder 157 permitting the spring 165 to return the piston 158 to normal position; with the return movement of this piston the second disk 136 is also brought to normal position, the pocket 140 therein being then out of register with the port 139 in the casing of the engineer's valve; the usual parts of the engineer's valve may now be manipulated to increase train pipe pressure, such increased pressure bringing the piston valve 153 to the position shown in Fig. 12, with equalization of pressure in the various chambers and passageways as already described; after such operations the mechanism is in position to again bring about application of the brakes when the pressure adjacent the top of the piston 32' is reduced by movement of the member 91 away from the passageway 88; it is to be noted that while the piston valve 32' is in any position but normal the usual parts of the engineer's valve cannot be used to manipulate the brakes; if so desired the valve 81, previously described in connection with Figs. 2 and 3, may be used to assist in returning the piston valve 32' to normal position; the time during which the brakes are applied (and cannot be released by manipulation of the usual parts of the engineer's valve) depends as mentioned, on the time of movement of the piston valve 32' and such time of movement may be varied by providing means for varying the area of the passageway 88 as previously set forth; the time of such movement is also determined by the size of the port 48' in the piston valve 32' and by the amount of clearance between the outside of the extension 143 and the side wall of the opening 25 between the chamber 30' and the chamber 23; it will be remembered that the bottom wall of the pocket 140 in the disk 136 is inclined, the purpose of which is to provide for various rates of flow of air from the train pipe to the atmosphere through the port 139; referring particularly to Fig. 12 it will be noted that the rod 159 extending from the piston 158 passes through a bushing 167 carried by the head 160 of the cylinder 157; this bushing is adapted to occupy various positions, since the engagement between the bushing and the head is screw-threaded, a lock-nut 168 being employed to maintain the bushing in set position; it is clear that the amount of travel of the piston 158 to the left (Fig. 12) is determined by the position of the inner end of the bushing, the greater the portion of the bushing within the cylinder the lesser will be the said travel of the piston; the bushing then, serves as a stop to limit the travel of the piston whereby the relative position of the pocket 140 in the disk 136 may be varied with respect to the port 139 when train pipe pressure is being reduced; the greater the travel of the said piston the greater will be the angle of movement of the said disk with consequent increase in the effective opening between the said pocket 140 and port 139; variation in the effective size of this opening varies the amount of reduction of train pipe pressure and consequently the force applied to the brakes in setting them; variation in the amount of reduction does not alter the operation of the mechanism as far as the result of applying the brakes is concerned but does alter the time in which the train speed will be brought under control, such control comprehending reduction of speed as well as actual stopping of the train.

The mechanism described brings about the results set forth at the beginning of the specification with consequent increase in the factor of safety of train operation, the construction being such that tampering therewith in order to defeat the purpose of the mechanism is substantially impossible; the relative sizes of the different ports, pockets, passageways, chambers and valves will be determined by the conditions under which the mechanism is intended to operate as will be appreciated by those skilled in the art;

the particular construction of the valves and pistons will embody features known to those skilled in the art and which make for efficient operation.

What I claim as my invention is—

1. In a mechanism, such as described, a body member having a portion adapted to be placed in communication with a train pipe under pressure, the body member being also provided with a second portion normally communicating with a region of lower pressure, means for normally closing communication between the said portions whereby train pipe pressure is maintained, means controlled by conditions of speed or traffic for bringing about movement of the said first means and placing the said portions in communication with consequent reduction of train pipe pressure, and means responsive to reduction of train pipe pressure closing communication between said second portion and said region of lower pressure after a predetermined time.

2. In a mechanism, such as described, a body member having a portion adapted to be placed in communication with a train pipe under pressure, the body member also being provided with a second portion normally communicating with a region of lower pressure, means for normally closing communication between the said portions, means for bringing about movement of the said first means whereby the said portions are placed in communication with consequent reduction of train pipe pressure, and other means for closing communication between said second portion and said region of lower pressure after a determined interval of time whereby reduction of such pressure beyond a determined amount is prevented.

3. In a mechanism, such as described, a body member having a portion adapted to be placed in communication with a train pipe under pressure, the body member being provided with a normally open outlet communicating with a region of lower pressure, means for closing communication between the said portion and outlet, means for restricting the area of the said outlet, electro-magnetic means comprising a member of magnetic material for causing movement of the said first means, the said portion and outlet being thereby placed in communication, with consequent reduction of train pipe pressure, and a device for closing the said normally open outlet after the said first means has operated and reduced the train pipe pressure to predetermined degree, the reduction of train pipe pressure depending on the area of the said outlet which determines the time elapsing before the said device closes the outlet, the said portion and outlet being in communication during such time.

4. In a mechanism, such as described, the combination of a body member adapted to be placed in communication with a train pipe under pressure, the body member having a normally open outlet communicating with a region of lower pressure, means for restricting the area of the said outlet, means acting under certain conditions for placing the train pipe in communication with the said outlet with consequent reduction of train pipe pressure, and means for closing said normally open outlet after the said first means has operated and reduced the train pipe pressure to predetermined degree, the reduction of train pipe pressure depending on the area of the said outlet whereby the duration of operation of the said second means is determined and the duration of communication of the said train pipe with the region of lower pressure is also determined.

5. In a mechanism, such as described, a body member having a portion adapted to be placed in communication with a train pipe under pressure, the body member being provided with an outlet communicating with a region of lower pressure, a valve for closing communication between the said portion and outlet, opposite parts of the valve being in communication with train pipe pressure whereby it is maintained in such position; electro-magnetic means comprising a member of magnetic material for bringing about a reduction of pressure adjacent one part of the valve with consequent movement thereof, the said portion and outlet then communicating with consequent reduction of train pipe pressure, and means for closing the said outlet after the valve has moved whereby reduction beyond a determined amount is prevented.

6. In a mechanism, such as described, a body member having a portion thereof adapted to be placed in communication with a train pipe under pressure, the body member being provided with an outlet communicating with a region of lower pressure, a valve for closing communication between the said portion and outlet, the valve being maintained in such position by the application of pressure to opposite parts thereof, means whereby the pressure adjacent one of the said parts may be reduced, electro-magnetic means for bringing the said first means into position to bring about such reduction with consequent movement of the valve, the said portion and outlet being placed in communication with consequent reduction of train pipe pressure, and means for closing the said outlet after the said valve has moved whereby reduction of pressure beyond a determined amount is prevented.

7. In a mechanism, such as described, a body member having a portion adapted to be placed in communication with a train pipe, the body member being provided with an outlet communicating with a region of lower pressure, a valve in the body member for closing communication between the said portion and the said outlet, the valve being maintained in such position by the application of pressure to opposite parts thereof, means whereby the pressure adjacent one part may be reduced with consequent movement of the valve, the said portion and outlet being thereby placed in communication with consequent reduction of train pipe pressure, and means for closing the said outlet whereby reduction of such pressure beyond a certain amount is prevented.

8. In a mechanism, such as described, a body member having a portion adapted to be placed in communication with a train pipe, the body member being provided with a normally open outlet communicating with a region of lower pressure, a valve for closing communication between the said portion and the said outlet, means for restricting the area of the outlet, movement of the valve placing the said portion in communication with the outlet whereby train pipe pressure is reduced, and means for closing the said normally open outlet whereby further reduction beyond a certain amount is prevented, the area of the outlet determining the rate of such reduction.

9. In a mechanism, such as described, a body member having a portion adapted to be placed in communication with a train pipe, the body member being provided with a passageway normally communicating with a region of pressure lower than that of the train pipe, a valve for closing communication between the said portion and the said passageway, movement of the valve placing the said portion in communication with the said passageway whereby train pipe pressure is reduced, and means for closing communication between said region of lower pressure and the said passageway after a certain reduction of train pipe pressure whereby further reduction is prevented.

10. In a mechanism, such as described, a body member having a portion for communication with a train pipe under pressure, the body member being provided with a passageway normally communicating with a region of lower pressure, a valve, the normal position of the valve closing communication between the said portion and the said passageway, movement of the valve placing the said portion in communication with the said passageway whereby train pipe pressure is reduced, and means controlled by the movement of the said valve for closing communication between said region of lower pressure and the said passageway whereby further reduction of train pipe pressure is prevented.

11. In a mechanism, such as described, a body member having a portion for communication with a train pipe, the body member being provided with an outlet communicating with a region of low pressure, a valve, the normal position of the valve closing communication between the said portion and the outlet, movement of the valve placing the said portion in communication with the outlet whereby train pipe pressure is reduced and the brakes applied, and means actuated by the difference between the original and reduced train pipe pressures for closing the outlet whereby further reduction of train pipe pressure is prevented.

12. In a mechanism, such as described, a body member having a portion thereof adapted to be placed in communication with a train pipe, the body member being provided with an outlet communicating with a region of low pressure, the body member being also provided with a chamber communicating with the said outlet, a valve closing communication between the said portion and the said chamber, movement of the valve placing the said portion in communication with the said outlet through the said chamber whereby the train pipe pressure is reduced, and means actuated by the difference between the original and reduced train pipe pressures for closing the said outlet whereby further reduction is prevented.

13. In a mechanism, such as described, the combination of a body member having a portion thereof adapted to be placed in communication with a train pipe, a second portion communicating with a region of lower pressure, a valve for closing communication between the said second portion and the said region, a piston in the body member, the piston in normal position closing communication between the said portions, one side of the said valve communicating with the said first portion whereby train pipe pressure acts against the said side, the opposite side of the said valve also communicating with the said first portion, means controlled by the piston for closing communication between the opposite side of the valve and the said portion, movement of the piston, when the mechanism operates, placing the said portions in communication with each other whereby train pipe pressure is reduced and the pressure adjacent the first side of the said valve is also reduced, movement of the piston also permitting the said means to close communication between the opposite side of the said valve and the said portion whereby normal pressure is maintained adjacent the said opposite side, the said valve thereby moving and closing the outlet whereby further reduction of train pipe pressure is prevented.

14. In a mechanism, such as described, the combination of a body member having a portion thereof adapted to be placed in communication with a train pipe, a valve in the body member, the body member being provided with an outlet which is adjustable in area, the outlet communicating with the atmosphere, a chamber in the body member communicating with the outlet, a valve for closing the outlet, one side of the valve communicating with the said portion whereby train pipe pressure acts on the said side, the other side of the valve also communicating with the said portion whereby train pipe pressure acts on such side, means permitting such communication, the said means being adapted to close such communication when the first valve moves, movement of the first valve placing the said portion in communication with the outlet through the said chamber whereby the train pipe pressure is reduced, movement of the first valve permitting said means to close the communication between the said portion and one side of the second valve, original pressure being thereby maintained adjacent the said side, the reduction of pressure in the said portion permitting the second valve to close the said outlet and prevent further reduction of train pipe pressure, the rate of such reduction depending on the area of the said outlet which determines the time interval in which the second valve closes.

15. In a mechanism, such as described, the combination of a body member having a portion of the interior thereof adapted to be placed in communication with a train pipe, a valve maintained in normal position by train pipe pressure, the body member being provided with an outlet which is adjustable in area, the outlet communicating with the atmosphere, a chamber in the body member communicating with the said outlet, a valve for closing the said outlet, the valve being maintained in normal position by train pipe pressure acting on opposite sides thereof, means for controlling the application of such pressure to one side of the valve, the said means depending on the position of the first valve, movement of the first valve placing the said portion in communication with the outlet through the said chamber, whereby the train pipe pressure is reduced, movement of the first valve also permitting the said means to operate whereby original train pipe pressure is maintained adjacent one side of the second valve, reduced train pipe pressure acting adjacent the other side of the second valve, the second valve thereby moving and closing the said outlet whereby further reduction of train pipe pressure is prevented, the amount of such reduction depending on the area of the outlet.

16. In a system for automatically controlling the speed of a vehicle, the combination with a vehicle, of an air brake system thereon, manually operable valve mechanism controlling said air brake system, automatic means responsive to vehicle speed for preventing control of said air brake system by said manually operable valve mechanism and for controlling said air brake system, said means comprising valve mechanism and electro-responsive means controlling the same, a vehicle circuit including a source of current and said electro-responsive means, and means disposed in the path of travel of said vehicle for inductively affecting said vehicle circuit.

17. In a system for automatically controlling the speed of a vehicle, the combination with a vehicle, of an air brake system thereon, manually operable valve mechanism for controlling said air brake system, automatic means responsive to vehicle speed for controlling said air brake system, said means comprising reservoir and train pipe connections, valve mechanism for closing communication between said reservoir and train pipe connections and said manually operable valve mechanism, a valve controlling said means, and electro-responsive means controlling said last named valve.

18. In a system for automatically controlling the speed of a vehicle, the combination with a vehicle, of an air brake system thereon, automatic means responsive to vehicle speed for controlling the air brake system comprising reservoir and train pipe connections, a valve having a port communicating with both sides thereof and with said train pipe connection, a connection between said train pipe connection and a region of lower pressure controlled by said valve, electro-responsive means controlling said valve comprising a normally energized electro-magnet and its normally attracted armature, a connection between one side of said valve and a region of lower pressure, closed by said armature when in its attracted position, said armature when freed from said magnet opening said last named connection and closing said port, whereby said valve moves and opens said connection between said train pipe connection and region of lower pressure, said armature being restored to its normal position by the motion of said valve.

19. In combination with the train pipe of an air brake system, a mechanism having a portion thereof communicating with the said pipe, a second portion of the mechanism communicating with a region of lower pressure, a valve for closing communication between the said portions, a passageway through the valve, both sides of the valve having train pipe pressure applied thereto whereby it is maintained in stationary position, the interior of the mechanism adjacent one side of the valve communicating with a region of lower pressure through a passageway, a member normally closing the said passageway, means for bringing the said member away from the said passageway and into position to close the passageway in the valve, the valve thereby moving due to the difference in pressures acting thereagainst, movement of the valve placing the said portions of the mechanism in communication with each other with consequent reduction of train pipe pressure and application of the brakes.

20. In a mechanism, such as described, the mechanism being provided with a chamber, a valve in the chamber, opposite portions of the valve having pressure applied thereto through a normally open passage in said valve whereby it is maintained stationary, the interior of the chamber adjacent one portion of the valve communicating with a region of lower pressure through a passageway, a member of magnetic material closing the passageway, pole pieces for maintaining the member in such position, a circuit associated with the said pole pieces for controlling the magnetic field thereof and operable under predetermined conditions whereby the said member may open the passageway and close said valve passage, the valve thereby moving due to the difference in pressures created on opposite portions of the valve.

21. A mechanism provided with a chamber, a valve in the chamber, pressures acting against opposite parts of the valve through a passage therein whereby it remains stationary, the mechanism being provided with a passageway communicating with the interior of the chamber adjacent one part of the valve and with a region of lower pressure, a member of magnetic material for closing the said passageway, means for maintaining a magnetic field whereby the said member is held in such position, and an electric circuit for varying the said field whereby the said member opens the passageway and closes said valve passage with consequent movement of the valve due to the difference in pressures created adjacent the said opposite parts thereof, said valve restoring said member of magnetic material to normal position.

22. A mechanism provided with a chamber, a valve in the chamber, the valve being provided with a normally open passageway communicating with the interior of the mechanism adjacent opposite parts of the said valve, the area of one part of the valve being substantially greater than the area of the opposite part, whereby the application of pressure to the interior of the mechanism and to opposite parts of the valve will maintain the valve stationary, the mechanism being provided with a passageway extending between a region of lower pressure and the interior of the chamber adjacent the part of the valve of greater area, a member normally closing said second named passageway, said member being movable, said movement permitting reduction of pressure in the interior of the chamber adjacent the part of greater area, whereby the created difference in pressures adjacent the opposite parts of the valve will bring about movement thereof.

23. In a mechanism, such as described, the mechanism being provided with a chamber, a valve in the chamber, the valve having pressure applied to opposite portions thereof through a passage therein whereby it remains stationary, the mechanism being provided with a passageway communicating with the said chamber and adjacent one portion of the valve and also communicating with a region of lower pressure, a member of magnetic material closing the said passageway, means for maintaining a magnetic field for holding the member in such position, a circuit associated with the said means, the circuit being controlled by predetermined conditions and adapted to neutralize the said field whereby the said member may move away from the said passageway and close said valve passage, one portion of the valve thereby having reduced pressure acting thereagainst, the valve moving under the created difference in pressures and restoring said member of magnetic material to passageway closing position.

24. In combination with the train pipe of an air brake system, a mechanism having a portion thereof communicating with the said pipe and a second portion communicating with a region of lower pressure, a valve for closing communication between the said portions, the valve being maintained in such position by the application of pressure to different parts thereof, a member of magnetic material, the interior of the mechanism adjacent one part of the valve communicating with a region of lower pressure through a passageway normally closed by said member of magnetic material, means for restricting the area of the said passageway, pole pieces for maintaining the said member in such position, an electrical circuit actuated by predetermined conditions for causing movement of the said member away from the passageway, the said member being received on the said valve, the said valve then moving and placing the said portions of the mechanism in communication with each other and with consequent reduction of train pipe pressure, the amount of the said reduction depending in part upon the area of the said passageway which determines the duration of travel of the said valve and member into position to bring the member adjacent the said passageway and thereby close it.

25. In combination with the train pipe of an air brake system, a mechanism having a portion thereof communicating with the said pipe and a second portion communicating with a region of lower pressure, a valve for closing communication between the said portions, the valve being maintained in such position by the application of pressure to different parts thereof, a member of magnetic material, the interior of the mechanism adjacent one part of the valve communicating with a region of lower pressure through a passageway normally closed by said member of magnetic material in one position, said member being returned to said position by movement of the valve, pole pieces for maintaining the said member in such position, a circuit comprising windings on the said pole pieces actuated by predetermined conditions of speed or traffic for neutralizing the field of the said pole pieces whereby the said member may move thereby placing the interior of the mechanism adjacent the said part of the valve in communication with the region of lower pressure, the valve moving under the created difference of pressure to put the said portions of the mechanism in communication with each other with consequent application of the brakes and restoring said member of magnetic material to normal position.

26. The combination with a magnet pole, of a member having a port, an armature member normally held attracted by said pole in position to close said port, an electromagnet winding associated with said pole, a circuit including a source of energy and said winding, and means for inductively influencing said circuit whereby said armature member is freed and said port uncovered.

27. The combination with an air brake system, of a valve controlling the same, a member having a port controlling said valve, a magnet pole, a detached armature member normally held attracted by said pole in position to close said port, a magnet winding controlling said pole, a permanently closed circuit including a source of energy and said winding, means for inductively affecting said circuit for releasing said armature member to uncover said port, said valve thereafter moving to control said air brake system and to restore said armature member.

28. In combination with the main reservoir and train pipe of an air brake system, a mechanism having separate portions, and through which said portions normally communicate with each other, other parts of the said system whereby usual application of the brakes is permitted, one of the said portions communicating with the reservoir and the other portion communicating with the said pipe, a chamber communicating with a region of lower pressure and adapted to be placed in communication with the said pipe, means adapted to be actuated by reservoir pressure for closing the said portions of the mechanism which communicate with each other, a valve in the said mechanism and maintained in normal position by the application of pressures to opposite parts thereof, a member associated with the said valve for closing the first said means to reservoir pressure, and a device controlled by electro-magnetic means for bringing about a reduction of pressure adjacent one part of the said valve whereby it will move, the said chamber thereby being placed in communication with the train pipe and the said member associated with the valve moved thereby permitting the first said means to close the said portions of the mechanism communicating with each other, the brakes being thereby applied.

29. In combination with an air brake system, a mechanism included therein, the mechanism having a portion communicating with the engineer's valve and with the main reservoir and a portion communicating with the said valve and the train pipe whereby usual application of the brakes is permitted, means for closing communication between each of the said portions and the said valve whereby application of the brakes will be controlled by the said mechanism, means for providing a reduction of train pipe pressure, the said means controlling the operation of the first said means, and a device associated with the said mechanism and adapted for operation by means independent of the brake system whereby the said mechanism may be operated with consequent application of the brakes.

30. In combination with an air brake system, a mechanism included therein and having a portion communicating with the engineer's valve and the main reservoir and a portion communicating with the said valve and the train pipe, whereby usual application of the brakes by operation of the said valve is permitted, means for closing communication between the said portions of the mechanism and the said valve, whereby application of the brakes will be controlled by the said mechanism, the said mechanism having means providing for reduction of train pipe pressure, operation of such means bringing about operation of the said first means, a device coöperating with the said mechanism for maintaining the said means in normal position, and means for bringing the said device to a second position whereby the mechanism operates with application of the brakes.

31. In combination with an air brake system, a mechanism having a portion communicating with the engineer's valve and the main reservoir and a portion communicating with the said valve and the train pipe whereby usual application of the brakes is permitted, means adapted to be operated by reservoir pressure for closing communication between the said portions of the mechanism and the said valve whereby the valve is rendered inoperative and the application of the brakes controlled by the said mechanism, the said mechanism having a portion communicating with the atmosphere, means for placing the train pipe in communication with the said portion whereby reduction of pressure in the pipe is brought about, operation of the said means also bringing about application of reservoir pressure to the first said means, a device for maintaining the mechanism in normal position, and electro-magnetic means controlling the operation of the said device and for bringing it to a second position with consequent operation of the mechanism and application of the brakes.

32. In combination with an air brake system, a mechanism having a portion of the interior thereof connected to the engineer's valve and also to the main reservoir, a second portion of the interior thereof connected to the engineer's valve and the train pipe, usual application of the brakes by means of the said valve being permitted, devices for closing communication between each of the said portions and the said valve whereby application of the brakes is controlled by the said mechanism, the said mechanism being provided with a portion communicating with the atmosphere, means for placing the train pipe in communication with the said portion and for bringing about application of reservoir pressure to the said devices whereby they are operated, a device which, in one position, maintains the said mechanism in normal position, the said device being adapted to be brought to a second position by electro-magnetic control whereby the mechanism operates with consequent application of the brakes.

33. In combination with an air brake system, a mechanism having a portion of the interior thereof connected to the engineer's valve and the main reservoir, a second portion of the interior being connected to the said valve and the train pipe, operation of the said valve in usual application of the brakes being permitted, valves for closing communication between the said mechanism and the engineer's valve whereby application of the brakes will be controlled by the said mechanism, one side of each valve being adapted to have reservoir pressure applied thereto whereby the valves are brought to such closed position, a portion of the said mechanism communicating with the atmosphere, means for placing the train pipe in communication with the said portion and for bringing about application of reservoir pressure to the said valves, and a device controlled by electro-magnetic means for maintaining the parts of the mechanism in normal position, operation of the said means bringing the device to a second position with consequent operation of the mechanism and application of the brakes.

34. In combination with an air brake system, a mechanism having a portion of the interior thereof connected to the engineer's valve and also to the main reservoir, a second portion of the interior thereof being connected to the said valve and the train pipe, usual application of the brakes by means of the said valve being permitted, valves for closing communication between the said portions of the mechanism and the said valve whereby application of the brakes will be controlled by the said mechanism, the said mechanism being provided with passageways for bringing reservoir pressure to one side of each of the said valves whereby they are moved, the said mechanism having a portion communicating with the atmosphere and another portion communicating with the train pipe, means for closing communication between the last said portions and also between the before-mentioned valves and the main reservoir, the said means in normal position having train pipe pressure acting on opposite portions thereof, a device controlled by predetermined conditions of speed or traffic for providing a reduction of pressure on one side of the said means whereby the said means will operate, thereby bringing the portions of the mechanism into communication with the atmosphere and the train pipe into communication with each other and also bringing reservoir pressure to one side of the said valves with consequent closing of the valves and application of the brakes.

35. In combination with an air brake system, a mechanism having a portion of the interior thereof connected to the engineer's valve and to the main reservoir, a second portion of the interior being connected with the said valve and the train pipe, application of the brakes by means of the said valve being permitted, means for closing communication between the said portions of the mechanism and the said valve whereby the application of the brakes is controlled by the said mechanism, the said means being operated by reservoir pressure, means controlling portions of the said mechanism leading to the atmosphere and the train pipe respectively for bringing about a reduction of pressure in the said pipe and for controlling communication between the first named means and reservoir, the said means in normal position having pressure acting on opposite sides thereof, a device controlled by speed or traffic conditions for bringing about a reduction of pressure on one side of the said means whereby the said means will move with consequent closing of the said first means between the mechanism and the valve and with consequent communication between the train pipe and the atmosphere, whereby the brakes are applied.

36. In combination with an air brake system, a mechanism connected to the engineer's valve and the main reservoir, the said mechanism being also connected to the said valve and the train pipe, the said connections being independent, separate means for closing the said connections to the said valve leaving the mechanism in communication with the reservoir and the train pipe, the said means in normal position permitting application of the brakes by means of the said valve and in closed position rendering the said valve inoperative, the said means being adapted to be operated by reservoir pressure, a portion of the interior of the mechanism communicating with the train pipe, a second portion of the interior communicating with a region of lower pressure, means for closing communication between the said portions, the said means also preventing the application of reservoir pressure to the before-mentioned connections closing means, the said means being maintained in normal position by the application of pressure to opposite parts thereof, and a device controlled by predetermined conditions of speed or traffic for bringing about a difference of pressures acting on the said means whereby the said means moves with consequent communication between the said portions in the interior of the mechanism and reduction of train pipe pressure and application of reservoir pressure to the said connections closing means, the brakes being thereby applied.

37. In combination with an air brake system, a mechanism connected to the engineer's valve and the main reservoir and providing for communication between these parts, the said mechanism having another portion thereof connected to the engineer's valve and the train pipe and providing for communication between such parts, second and third valves for closing the said connections to the said engineer's valve thereby leaving the said mechanism in communication with the reservoir and the train pipe, the said second and third valves in normal position permitting application of the brakes by manipulation of the engineer's valve, the said second and third valves in closed positions providing for application of the brakes by operation of the said mechanism, passageways communicating with the reservoir connection and with one side of each of the said second and third valves whereby they may be operated, a passageway in the said mechanism communicating with the train pipe, a passageway communicating with a region of lower pressure, a fourth valve maintained in normal position by the application of pressures to opposite parts thereof, the said fourth valve in such position closing communication between the said last named passageways, a part associated with said fourth valve closing communication between said second and third valves and said first named passageways, and a device controlled by predetermined conditions of speed or traffic for bringing about a reduction of pressure adjacent one part of the said fourth valve whereby said fourth valve will move thereby placing the train pipe in communication with the region of lower pressure and bringing about movement of the part associated therewith whereby reservoir pressure is applied to said second and third valves with consequent closing thereof and application of the brakes.

38. In combination with the main reservoir and train pipe of an air brake system, a mechanism having a portion communicating with the reservoir and a portion communicating with the train pipe, the said portions normally communicating with each other through other parts of the system whereby usual application of the brakes is permitted, devices for closing communication between the said portions whereby the said mechanism will control the application of the brakes, the said devices being operable by reservoir pressure, the said mechanism comprising parts for providing a reduction of train pipe pressure, an element associated with the said parts and operating therewith for controlling the application of reservoir pressure to the said devices, and means adapted to be operated by track or traffic conditions for bringing about operation of the said parts with consequent application of the brakes.

39. In combination with the main reservoir and train pipe of an air brake system, a mechanism having a portion communicating with the said reservoir and a portion communicating with the said train pipe, the said portions normally communicating with each other through other parts of the said system whereby usual application of the brakes is permitted, devices for closing communication between the said portions whereby the said mechanism will control application of the brakes, the said mechanism comprising means for providing a reduction of train pipe pressure, such means having a part associated therewith for controlling operation of the said devices, and a device adapted to be operated under certain track or traffic conditions for bringing about operation of the said means with consequent application of the brakes.

40. In combination with the main reservoir and train pipe of an air brake system, a mechanism having a portion communicating with the said reservoir and a portion communicating with the train pipe, the said second portion being adapted to be placed in communication with the atmosphere in order to bring about an application of the brakes, the said portions normally communicating with each other through other parts of the said system whereby the system may be operated independently of the said mechanism, means for closing such communication in the operation of the mechanism, means for placing the train pipe in communication with the atmosphere, such means also bringing about operation of the said first means, a device for coöperation with the said second means and adapted to be operated under certain track or traffic conditions for bringing about operation of the said means with consequent application of the brakes.

41. In combination with the main reservoir and train pipe of an air brake system, a mechanism having a portion communicating with the said reservoir and a portion communicating with the said pipe, the said portions communicating with each other through other parts of the said system when the said mechanism is in normal condition, whereby the system may be operated as usual, devices actuated by reservoir pressure for closing communication between the said portions of the mechanism, means providing for a reduction of train pipe pressure, the said means also controlling the operation of the said devices, and means for coöperation with the pressure reducing means and controlled by traffic or track conditions for bringing about operation of the said mechanism.

42. In combination with the main reservoir and train pipe of an air brake system, a mechanism having portions communicating with the said parts respectively, the said portions communicating with each other through parts of the said system when the mechanism is in normal condition, means actuated by reservoir pressure for closing such communication, the mechanism comprising means for bringing about a reduction of train pipe pressure whereby the brakes may be operated, the said means having parts associated therewith whereby the first said means may operate, and a device coöperating with the pressure reducing means whereby the mechanism may be actuated.

43. The combination with a valve held stationary by the application of fluid pressure to different parts thereof through a normally open passage therein, means for reducing the pressure on one side of said passage and for closing said passage, an electromagnetic means controlling said means.

44. The combination with a valve held stationary by the application of fluid pressure to different parts thereof through a passage therein, means in one condition closing communication to a region of different pressure and in another condition closing said passage, and an electric circuit controlling said means to open said communication and close said passage, whereby said valve is moved.

45. The combination with a valve held stationary by the application of fluid pressure to different parts thereof through a passage therein, means in one condition closing communication to a region of different pressure and in another condition closing said passage, said means being restored to the first named condition by movement of the valve, and an electric circuit controlling said means to open said communication and close said passage, whereby said valve moves and restores said means.

46. The combination with a valve held stationary by the application of fluid pressure to different parts thereof through a passage therein, means in one condition closing communication to a region of different pressure and in another condition closing said passage, said means being restored to the first named condition by movement of the valve, and an electric circuit controlling said means to open said communication and close said passage, whereby said valve moves and restores said means, and a valve actuated by said first named valve opening communication between a source of pressure and the low pressure side of the first named valve, whereby said first named valve is returned to normal position.

47. In a mechanism, such as described, a valve held stationary by pressure acting on different parts thereof through a passage therein, the mechanism being provided with a passageway adjacent one of the said parts and communicating with a region of lower pressure, a member of magnetic material closing the said passageway, means for holding the said member in such position and a circuit for coöperation with the said means whereby the member will be moved to open said passageway and close said passage with consequent movement of the valve.

48. In a system for automatically controlling the speed of a vehicle, the combination with a vehicle, of an air brake system thereon, a valve controlling said system, and a second valve controlling said valve comprising an armature member normally closing a port, a permanently closed vehicle circuit including a source of energy and an electro-magnet normally holding said armature member in port closing position, and means disposed in the path of travel of said vehicle for inductively affecting said circuit whereby said armature member is released to uncover said port.

49. In a system for automatically controlling the speed of a vehicle, the combination with a vehicle, of an air brake system thereon comprising a train pipe from which air may be exhausted to apply the brakes, a valve controlling exhaust of said train pipe, means for retarding movement of said valve, means controlling the rate of exhaust of said train pipe, and means controlling said valve comprising an armature member and a port normally closed thereby, a permanently closed vehicle circuit including a source of energy and an electro-magnet normally holding said armature member in port closing position, means disposed in the path of travel of said vehicle for inductively affecting said circuit for releasing said armature member, and a second valve actuated by said first named valve after predetermined movement thereof for opening communication with a source of pressure for returning first named valve to normal position.

50. The combination with a cylinder closed to the atmosphere, of a piston movable therein, said piston having different areas on opposite sides thereof subjected to the same pressure through a passageway therein, a valve seat communicating with the exterior of said cylinder, a magnet pole within said cylinder, a detached armature member held by said pole against said valve seat, means for guiding said armature member to position to close said piston passage, and a circuit controlling said pole to cause said armature member to leave said valve seat and to close said passage.

51. The combination with a cylinder closed to the atmosphere, of a piston movable therein, said piston having different areas on opposite sides thereof subjected to the same pressure through a passageway therein, a valve seat communicating with the exterior of said cylinder, a magnet pole within said cylinder, a detached armature member held by said pole against said valve seat, means for guiding said armature member to position to close said piston passage, and a circuit controlling said pole to cause said armature member to leave said valve seat and to close said passage, said piston returning said armature member to normal position.

52. In a mechanism, such as described, a valve having a passageway therein whereby pressure may be communicated to opposite parts of the valve in order to hold it stationary, and a member providing for a reduction of pressure adjacent one of the said parts whereby the valve may move and close the said passageway when the reduction in pressure is brought about.

53. In a mechanism, such as described, a valve having a passageway therein whereby pressure may be communicated to different parts of the valve in order to hold it stationary, means communicating with a region of lower pressure and adjacent one of the said parts, a member adjacent the said means preventing such communication, movement of the said member permitting movement of the valve under the created difference in pressure, the member coming to rest in position to close the said passageway.

54. In a mechanism, such as described, a valve having a passageway therein and communicating with different portions thereof whereby pressure may be applied to these portions in order to hold the valve stationary, electromagnetic means preventing communication between one of the said portions and a region of lower pressure, a circuit coöperating with the said means whereby an element thereof may be moved in order to bring about movement of the valve under the created difference in pressure, the said element closing the said passageway during movement of the valve.

55. In a mechanism, such as described, a piston held in position by the application of pressure to different parts thereof through a passage therein, a valve having an adjustable passage therein, the valve being positioned between one of the said parts and a region of lower pressure, electro-magnetic means coöperating with the valve for normally closing the said adjustable passage, and a circuit for coöperation with the said means whereby the adjustable passage may provide communication between the said part and the region of lower pressure, said means when affected by said circuit closing said piston passage with consequent movement of the valve, the rate of movement thereof depending on the area of the said passage.

56. In a mechanism, such as described, a piston held in position by the application of pressure to different parts thereof through a port therein, a valve having a variable passage therein, the valve being positioned between one of the said parts and a region of lower pressure, a member of magnetic material normally closing the said passage, means for providing a magnetic field for holding the member in such position, a circuit associated with the said means for neutralizing the field, under certain conditions, whereby the said member may be moved to open said passage and close said port and the consequent difference in pressures acting on said piston will bring about movement thereof, the rate of such movement depending on the area of the said passage.

57. In a mechanism, such as described, a piston provided with a passageway and held in position by the application of pressure to different parts thereof, the said passageway extending between the said parts, a valve having a variable opening therein, the valve being poistioned between one of the said parts and a region of lower pressure, a member of magnetic material normally closing the said opening, means providing a magnetic field for holding the member in such position, a circuit associated with the said means for neutralizing the field, under certain conditions, whereby the said member will be moved and the consequent difference in the pressures acting on the piston will cause movement thereof, the said member in removed position closing the said passageway, the rate of movement of the piston depending on the area of the opening in the said valve.

58. In a mechanism, such as described, a piston provided with a passageway communicating with different parts thereof, the areas of the said parts being unequal, the piston being held in position by the application of pressure to the part of greater area, the said pressure also acting on the part of lesser area, a valve having a variable opening therein, the valve being positioned between the part of the greater area and a region of lower pressure, a member of magnetic material normally closing the said opening whereby the said piston is held stationary, means providing a magnetic field for holding the said member in such position, a circuit associated with the said means for neutralizing the field, under certain conditions, whereby the said member will be moved from the said opening, the piston then moving under the created difference in pressures acting thereon, the said member then closing the passageway in the piston, the rate of movement of the piston depending on the area of the opening in the valve.

59. A mechanism for coöperation with a train pipe under pressure, the mechanism being adapted to be placed between the pipe and a region of lower pressure and in communication with each, a valve normally closing communication between the pipe and the region of lower pressure, the valve being maintained in such position by the application of train pipe pressure to different parts thereof, a passageway adjacent one of the parts and communicating with a region of lower pressure, a member of magnetic material normally closing the said passageway, a circuit comprising a part associated with the said member whereby it may be moved away from the said passageway, the valve thereby moving and placing the pipe in communication with the region of lower pressure with consequent reduction of train pipe pressure and application of the brakes, a valve for closing communication between the said pipe and region of lower pressure, the valve being maintained in open position by the application of train pipe pressure, means whereby the time of closing of the said valve may be varied with consequent variation in the amount of reduction of train pipe pressure, means operating after the movement of the first valve whereby the second valve closes, movement of the first valve returning the said member to normal position after a determined interval of time, and means whereby train pipe pressure may be applied to the said part of the first valve in order to bring it to normal position, the brakes being adapted to be released and the said second valve to be returned to normal position.

60. In combination with an air brake system, a mechanism for applying the brakes under certain conditions, the engineer's valve communicating with the main reservoir and with the train pipe through portions of the said mechanism whereby usual application of the brakes by the said valve is permitted, the mechanism having a portion communicating with a region of low pressure, a valve for closing communication between the train pipe and the region of low pressure, means for closing communication between the engineer's valve and the main reservoir and the train pipe, movement of the said valve permitting the said means to operate whereby application of the brakes by the engineer's valve is prevented and also placing the train pipe in communication with the region of low pressure whereby the train pipe pressure is reduced, means for closing communication between the train pipe and the region of low pressure after the said valve has operated whereby a certain reduction of train pipe pressure is brought about, means whereby the said valve may be returned to normal position, the means for closing communication between the engineer's valve and the main reservoir and the train pipe then returning to normal position, the engineer's valve being then operable to increase train pipe pressure and release the brakes, the means controlling the reduction of train pipe pressure being then returned to normal position.

61. In combination with an air brake system, a mechanism providing for application of the brakes under certain conditions, the said mechanism in normal condition permitting the engineer's valve to communicate with the main reservoir and the train pipe and the atmosphere whereby usual manipulation of the brakes by the said valve is permitted, the mechanism having a portion communicating with a region of low pressure and a portion communicating with the train pipe, a valve normally closing communication between the said portions, means for closing communication between the engineer's valve and the main reservoir and also the train pipe, the said last named portion of the mechanism still communicating with the train pipe, the engineer's valve being then inoperative, movement of the said valve permitting the said closing means to operate, movement of the said valve also permitting the said portions of the mechanism to communicate whereby train pipe pressure is reduced and the brakes applied, means for limiting the amount of reduction of such pressure, the said means operating after the said valve has moved, the return of the said valve to normal position permitting the said means closing communication between the engineer's valve and the main reservoir and also the train pipe to return to normal position, the engineer's valve being then operable to release the brakes and return the said means limiting the reduction of train pipe pressure to normal position.

62. In combination with an air brake system, a mechanism providing for application of the brakes independently of the engineer's valve, the said mechanism in normal condition permitting the engineer's valve to be operated in the usual manipulation of the system, the mechanism having a portion communicating with the train pipe and a portion communicating with the region of low pressure, a valve normally closing communication between the said portions, means for closing communication between the engineer's valve and the main reservoir and also the train pipe, the said first named portion of the mechanism being in communication with the train pipe, the engineer's valve being then inoperative, the said valve being maintained in normal position by the application of pressure to different parts thereof, means controlled by conditions of speed or traffic for bringing about a reduction of pressure adjacent one part of the said valve whereby it moves, movement of the valve also placing the said portions in communication with consequent reduction of train pipe pressure and application of the brakes, means limiting the amount of such reduction, the return of the said valve to normal position permitting the said closing means to return to normal position, the engineer's valve being then operable to release the brakes and to return to said pressure limiting means to normal position, and means for determining the time during which the engineer's valve is inoperative.

63. In combination with an air brake system, a mechanism providing for application of the brakes under certain conditions, and independently of the engineer's valve, the said mechanism in normal condition permitting manipulation of the brakes by the engineer's valve, the mechanism having a portion communicating with the train pipe and a portion communicating with a region of low pressure, a valve normally closing communication between the said portions, means for closing communication between the engineer's valve and the main reservoir and the train pipe, the said first named portion of the mechanism still communicating with the train pipe, the engineer's valve being then inoperative, the said valve being maintained in normal position by the application of pressure to different parts thereof, a passageway adjacent one of the parts, means whereby the area of the passageway may be varied, the passageway communicating with a region of low pressure, a member of magnetic material normally closing the said passageway, means for maintaining an electromagnetic field for holding the said member in such position, a circuit associated with the said means for bringing about movement of the said member away from the passageway with consequent reduction of pressure adjacent the said part and movement of the valve, such movement permitting the said closing means to operate and also placing the said portions in communication whereby the train pipe pressure is reduced and the brakes applied, means limiting the amount of such reduction, means for bringing about a return of the said valve to normal position, the said closing means being thereby permitted to return to normal position, the engineer's valve being then operable to release the brakes, the said pressure limiting means returning to normal position, the area of the opening in the said passageway determining the time of movement of the said valve and the time during which the brakes cannot be released.

64. In combination with an air brake system, a mechanism providing for application of the brakes independently of the engineer's valve and for a determined interval of time at a certain reduction of pressure, the said mechanism in normal condition permitting manipulation of the brakes by the engineer's valve, the mechanism having a portion communicating at all times with the train pipe and a second portion communicating with a region of low pressure, a valve normally closing communication between the said portions, valves for closing communication between the engineer's valve and the main reservoir and also the train pipe, the said valves being moved by reservoir pressure, the said first valve being maintained in normal position by the application of train pipe pressure to different parts thereof, a passageway adjacent one of the parts and communicating with a region of low pressure, means for varying the area of the said passageway, a member of magnetic material normally closing the passageway, means for maintaining an electro-magnetic field for holding the said member in such position, a circuit associated with the said means for causing movement of the member away from the passageway with consequent movement of the valve, a part associated with the said valve and providing, after the first valve moves, for the application of reservoir pressure to the said valves and closing them whereby the engineer's valve is rendered inoperative, movement of the first valve placing the said portions in communication with consequent reduction of train pipe pressure and application of the brakes, a valve controlled by train pipe pressure for closing communication between the said portions and the region of low pressure whereby further reduction of train pipe pressure is prevented, means for determining the time of closing the said valve whereby the amount of reduction of such pressure is determined, movement of the first valve after an interval of time depending on the area of the said passageway returning the said member to normal position to close the said passageway, and a valve for then applying train pipe pressure to the part of the first valve adjacent the said passageway whereby return movement of the first valve is begun, the return of the first valve to normal position bringing the part associated therewith into position to permit the said valves to return to normal position by means of reservoir and train pipe pressure, whereby the engineer's valve is again operable for releasing the brakes and returning the valve controlling the amount of pressure reduction to normal position, the time during which the engineer's valve is inoperative depending on the time elapsing between the beginning of movement of the first valve and the return thereof to normal position, such time depending on the area of the said passageway communicating with the region of low pressure.

65. A mechanism for coöperation with a train pipe under pressure for bringing about a reduction of such pressure, the mechanism having a portion for connection to the train pipe and a portion to be connected to a region of lower pressure, a valve for normally closing communication between the said portions, the valve being maintained in such position by the application of pressure to different parts thereof, a passageway adjacent one of the parts for communication with a region of lower pressure, means for normally closing the passageway, other means for bringing the said means to a second position whereby the application of pressure to the said part is cut off and the said part placed in communication with the region of lower pressure, the valve moving and placing the said portions in communication with consequent application of the brakes, movement of the valve returning the said first means to normal position, and a valve actuated after movement of the first valve whereby pressure is communicated to the said part of the first valve and the first valve returns to normal position, the brakes being then adapted to be released.

66. A mechanism for coöperation with a train pipe under pressure for bringing about a reduction of such pressure, the mechanism being provided with a portion for communication with the train pipe and with a second portion for communication with a region of lower pressure, a valve normally closing communication between the said portions, different parts of the valve having areas of different extent, each of the said areas having pressure applied thereto, the pressure acting on the area of greater extent maintaining the valve in normal position, means whereby the said pressure may be reduced with consequent movement of the valve and the provision of communication between the said portions with application of the brakes, the valve as it approaches the end of such movement coacting with portions of the said means whereby further movement thereof is prevented, and means for them applying pressure to the area of greater extent whereby the valve will be returned to normal position, the brakes being adapted to be released.

67. A mechanism for coöperation with a train pipe under pressure for bringing about a reduction of such pressure, the mechanism being provided with a portion for communication with the said pipe and a second portion for communication with a region of lower pressure, a valve normally closing communication between the said portions, opposite parts of the valve having areas of different extent, passageways whereby train pipe pressure may be applied to the said areas, the pressure acting on the area of greater extent maintaining the valve in such position, a passageway adjacent the area of greater extent for communication with a region of lower pressure, a member of magnetic material normally closing the said passageway, means for maintaining an electromagnetic field for holding the member in such position, a circuit comprising a portion associated with the said means and for causing a movement of the said member away from the passageway, the area of greater extent thereby communicating with the region of lower pressure and the valve moving, the said member in remote position closing one of the said passageways, the valve thereby moving and placing the said portions in communication whereby the brakes are applied, the said valve during movement restoring the said member to normal position, and a second valve controlling the application of train pipe pressure to the area of greater extent, the said second valve being actuated by the first valve after the said member has been restored, whereby the first valve returns to normal position and the brakes are adapted to be released.

68. A mechanism for coöperation with a train pipe under pressure, the said mechanism being adapted to be placed between the pipe and a region of lower pressure, the mechanism comprising a valve normally closing communication between the train pipe and the region of lower pressure, movement of the valve placing the pipe in communication with the region of lower pressure, means for closing communication between the pipe and the region of lower pressure after an interval of time whereby further reduction of such pressure is prevented, the brakes being thereby applied, means whereby the valve may be returned to normal position after an interval of time, the brakes being adapted to be released and the said first means returned to normal position.

69. A mechanism for coöperation with a train pipe under pressure, the said mechanism being adapted to be placed between the pipe and a region of lower pressure, the mechanism comprising a valve normally closing communication between the said pipe and the region of lower pressure, the said valve being adapted to be brought to a second position whereby the said pipe and region of lower pressure are placed in communication with consequent application of the brakes, a second valve for closing communication between the said pipe and the region of lower pressure, means whereby the time of closing of the second valve may be varied with consequent variation in the reduction of pressure, the second valve being controlled by the said first valve, means for varying the time of movement of the first valve, the return of the first valve to normal position permitting the brakes to be released and the second valve to be returned to normal position.

70. A mechanism for coöperation with a train pipe under pressure, the mechanism being adapted to be placed between the pipe and a region of lower pressure and in communication with each, a valve normally closing communication between the pipe and the region of lower pressure, the valve being maintained in such position by the application of train pipe pressure to different parts thereof, a passageway adjacent one of the said parts and communicating with a region of lower pressure, means normally closing the said passageway, movement of the said means away from the passageway bringing about movement of the valve through the reduction in pressure adjacent the said side, a valve for closing communication between the said pipe and the region of lower pressure after a determined interval of time whereby the time of communication of the said pipe with the said region is fixed and the reduction of train pipe pressure is determined, the second valve being controlled by the movement of the first valve, movement of the first valve returning the said means to normal position, there being means whereby the time of such movement of the first valve may be varied.

71. In a mechanism, such as described, a body member having a portion adapted to be placed in communication with a train pipe under pressure, the body member also having a portion normally communicating with a region of lower pressure, means whereby the said portions may be placed in communication with reduction of train pipe pressure and consequent application of the brakes, and means whereby the first means are returned to normal position by the action of train pipe pressure, the brakes being then adapted to be released.

72. In a mechanism, such as described, a body member having a portion adapted to be placed in communication with a train pipe under pressure, the said mechanism also having a portion for communication with a region of lower pressure, means for closing communication between the said portions whereby train pipe pressure may be maintained, means whereby the said first means may be operated in order to place the said portions in communication with consequent reduction of train pipe pressure and application of the brakes, means whereby the first said means are returned to normal position by the action of train pipe pressure, the brakes being then adapted to be released, and means for determining the time during which the said portions are in communication, the brakes being set during such time.

73. In a mechanism, such as described, a body member having a portion adapted for communication with a train pipe, the said member also having a portion for communication with a region of lower pressure, a valve normally closing communication between the said portions whereby train pipe pressure is maintained, the valve being maintained in such position by the application of train pipe pressure to opposite parts thereof, one part of the said valve communicating with a region of lower pressure, means for normally closing such communication, means for bringing about communication of the said part with the region of lower pressure whereby the said valve will move under the difference in pressure, the said portions being thereby placed in communication with consequent reduction of train pipe pressure and application of the brakes, means whereby the said valve may be returned to normal position, the brakes being then adapted to be released, the means of communication between the said part of the valve and the region of lower pressure being adjustable whereby the time during which the said portions are in communication may be determined, the brakes being set during such time.

74. In a mechanism, such as described, a body member having a portion adapted for connection to a train pipe, a second portion for communication with a region of lower pressure, a valve for closing communication between the said portions, opposite parts of the valve being of unequal areas, the valve being maintained in such position by the application of train pipe pressure to such areas, a passageway for placing the part of the valve of greater area in communication with a region of lower pressure, the said passageway being of adjustable area, means for normally closing the passageway, means for moving the first means in order to uncover the said passageway, the valve then moving and placing the said portions of the mechanism in communication with consequent application of the brakes, movement of the valve returning the first means to normal position, and other means for then applying train pipe pressure to the part of the valve of greater area whereby the valve returns to normal position, the brakes being then adapted to be released, the time during which the said passageway is uncovered depending on the area thereof.

75. In a mechanism, such as described, a body member having a portion adapted for connection to a train pipe under pressure, a second portion for communication with a region of lower pressure, a valve for closing communication between the said portions, different parts of the valve being of unequal area, the valve being maintained in such position by the application of train pipe pressure to such areas, a passageway for placing that part of the valve of greater area in communication with a region of lower pressure, the area of the said passageway being adjustable and such adjustment governing the time period of operation of the valve and consequently the time of application of the brakes, a member normally closing the passageway, means whereby the member may be moved away from the passageway into position to prevent the application of pressure to the part of the valve of greater area, the valve then moving and placing the said portions in communication with consequent application of the brakes, movement of the valve returning the said member to normal position, and means actuated by the valve for providing train pipe pressure to the part of the valve of greater area, the valve then returning to normal position and the brakes being adapted to be released, the time during which the said portions are in communication depending on the area of the said passageway.

76. In a mechanism, such as described, a body member having a portion for communication with a train pipe under pressure, a second portion for communication with a region of lower pressure, a valve for closing communication between the said portions, different parts of the valve being of unequal areas, the valve being maintained in such position by the application of train pipe pressure to such areas, a passageway for placing that part of the valve of greater area in communication with a region of lower pressure, the area of the said passageway, means for providing an electro-magnetic field for holding the said member in such position, magneto-motive-force associated with the said means for overcoming the field and permitting the said member to move, when a predetermined change of potential occurs in said electro-magnetic field, the member coming into position to close the application of pressure to the said part of the valve of greater area, the valve then moving and placing the said portions in communication with consequent application of the brakes, movement of the valve returning the said member to normal position, and a second valve actuated by the first valve, after the said member has been returned, for applying train pipe pressure to the part of the first valve of greater area, the first valve then returning to normal position and the brakes being adapted to be released, the time during which the brakes are set depending on the time of movement of the first valve, such time of movement depending on the area of the said passageway.

In testimony whereof I sign my name to this specification in the presence of two witnesses.

GEORGE P. FINNIGAN.

Witnesses:
  LAWRENCE J. GALLAGHER,
  JOHN A. BERGSTROM.